United States Patent
Shuster

(10) Patent No.: US 6,904,453 B2
(45) Date of Patent: *Jun. 7, 2005

(54) METHOD, APPARATUS AND SYSTEM FOR DIRECTING ACCESS TO CONTENT ON A COMPUTER NETWORK

(75) Inventor: Brian Shuster, Stateline, NV (US)

(73) Assignee: Ideaflood, Inc., Fresno, CA (US)

( * ) Notice: Subject to any disclaimer, the term of this patent is extended or adjusted under 35 U.S.C. 154(b) by 418 days.

This patent is subject to a terminal disclaimer.

(21) Appl. No.: 10/103,156

(22) Filed: Mar. 20, 2002

(65) Prior Publication Data

US 2002/0169829 A1 Nov. 14, 2002

Related U.S. Application Data

(63) Continuation of application No. 09/183,605, filed on Oct. 30, 1998, now Pat. No. 6,389,458.

(51) Int. Cl.[7] .............................................. G06F 15/16
(52) U.S. Cl. ...................... 709/203; 709/202; 709/213; 709/217; 709/219; 713/201; 707/10
(58) Field of Search ................................ 709/202, 203, 709/213, 217; 705/26; 713/201; 707/10

(56) References Cited

U.S. PATENT DOCUMENTS

| | | | | |
|---|---|---|---|---|
| 5,793,964 A | * | 8/1998 | Rogers et al. ............... 709/202 |
| 5,796,967 A | * | 8/1998 | Filepp et al. ................ 345/764 |
| 5,908,469 A | * | 6/1999 | Botz et al. ................... 713/201 |
| 5,970,472 A | * | 10/1999 | Allsop et al. ................. 705/26 |
| 6,003,047 A | * | 12/1999 | Osmond et al. ............. 715/513 |
| 6,011,537 A | * | 1/2000 | Slotznick ..................... 345/733 |
| 6,044,372 A | * | 3/2000 | Rothfus et al. ............... 707/10 |
| 6,049,835 A | * | 4/2000 | Gagnon ........................ 709/245 |
| 6,052,120 A | * | 4/2000 | Nahi et al. ................... 345/700 |
| 6,170,060 B1 | * | 1/2001 | Mott et al. ................... 713/201 |
| 6,247,133 B1 | * | 6/2001 | Palage et al. ................ 713/201 |
| 6,268,856 B1 | * | 7/2001 | Bruck et al. ................. 345/733 |
| 6,339,644 B1 | * | 1/2002 | O'Neil et al. ............. 379/90.01 |
| 6,389,458 B2 | * | 5/2002 | Shuster ........................ 709/213 |
| 2003/0160807 A1 | * | 8/2003 | Carroll ......................... 345/700 |

OTHER PUBLICATIONS

"How To Intercept The ButtonClick On The Back And Forward Arrows" by Ronald van Doorn, Newsgroups: comp.lang.javascript; Feb. 22, 1997; pp. 1–3.

"Pop Up Window Left On Screen" by Decklin Foster, Newsgroups: comp.infosystems.www.authoring.html; Apr. 7, 1997; p. 1.

NN3.01 Crashes With OnUnload: by Anthony q. Bachler, Newsgroups: comp.lang.javascript; Feb. 14, 1997; p. 1.

"Trapping BACK Browser Button" by Biff Steel, Newgroups: comp.lang.javascript; Apr. 17, 1997; p. 1.

(Continued)

Primary Examiner—Hosain Alam
Assistant Examiner—ThuHa Nguyen
(74) Attorney, Agent, or Firm—O'Melveny & Myers LLP

(57) ABSTRACT

Embodiments of the instant invention are directed to a method, apparatus and system for directing an on-line user to predetermined information. Preferred embodiments of the instant invention interface with the user's browser to utilize the functions of the browser for directing user "traffic" on a network. In preferred embodiments, when a user accesses a web site page, a traffic control program is executed for the page, wherein the traffic control program controls the transmission (downloading) of data to the user computer and further creates a modified set of rules for at least one of the browser functions. Upon query (or other interaction) by the browser prior to closing page, the traffic control program interacts with the browser software to modify or control one or more of the browser functions, such that the user computer is further directed to a predesignated site or page (and displays a predesignated frame) upon execution of a browser function, instead of accessing the site or page typically associated with the selected browser function.

14 Claims, 4 Drawing Sheets

OTHER PUBLICATIONS

"My Legs Are Spread Open" by Barbie, Newsgroups: alt.binaries.erotica,alt.binaries.erotica.fetish, This is the only article in this thread alt.binaries.pictures.erotica; Oct. 24, 1997; pp. 1–2.

AM "Nu" Anonymous (!!atest@test.com, Newsgroup: alt.sex.teddy–ruxpin; Oct. 24, 1997; pp. 1–2.

Search result page from: http://groups.google.com/groups-?selm=33E28590.2EC4%40thaihome.com&output=gplain, From search on Aug. 7, 2002, showing archived page dated Aug. 1, 1997 including program code in JavaScript.

Search result page from: http://groups.google.com/groups-?selm=34215F27.EAD281AB@sunshinefilm.com&output=gplain, From search on Aug. 7, 2002, showing archived page dated Sep. 18, 1997 including program code in JavaScript.

* cited by examiner

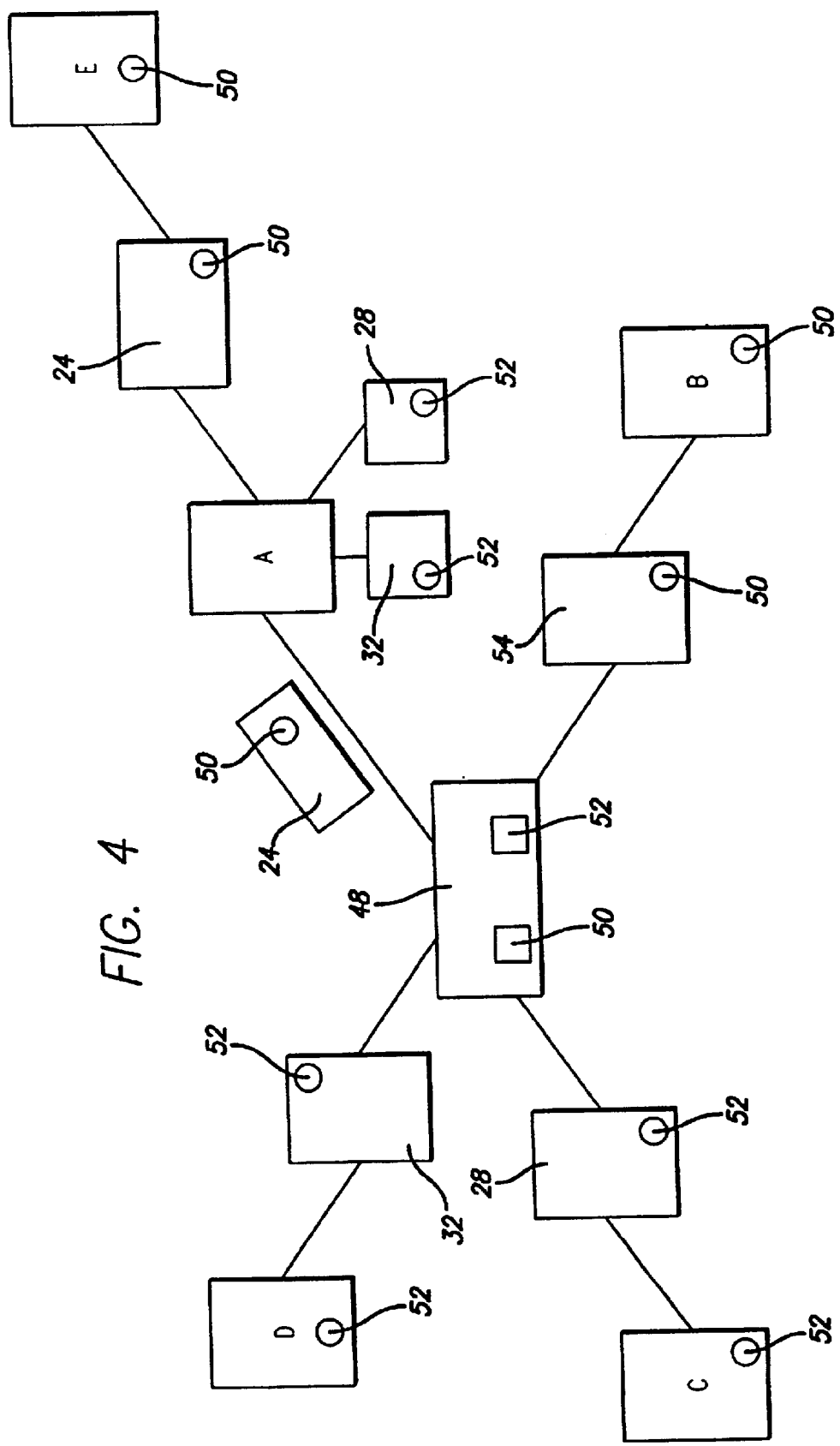

US 6,904,453 B2

METHOD, APPARATUS AND SYSTEM FOR DIRECTING ACCESS TO CONTENT ON A COMPUTER NETWORK

RELATED APPLICATIONS

This is a continuation of Ser. No. 09/183,605 filed Oct. 30, 1998. now U.S. Pat. No. 6,389,458.

FIELD OF THE INVENTION

This invention is directed to a method, apparatus and system for directing and diverting access to content on a computer network and, in preferred embodiments, for effectively directing on-line users to predetermined information, including, but not limited to, promotional, sales, advertising, safety, health, political or governmental information.

BACKGROUND OF THE INVENTION

Since their early development in the 1950's and 1960's, the use of computer networks for communication and sharing of information (or content) between multiple computers has become increasingly popular and diverse. In many modem businesses and organizations, computers are interconnected in a closed architecture, or intranet, to allow communication between defined computers within the business or organization. Open, public-access networks, typically referred to as internets, on the other hand, allow access to any computer that logs on (or otherwise connects) to the network. The largest open network is the Internet, which is composed of a large number of computers interconnected through internets, intranets or individually, enabling computer users to share vast amounts of on-line information and resources.

Information (or content) is generally transferred between computers on the network as files, which may contain data corresponding to, for example, text, photographs, graphics, video and/or audio. A set of protocols, standards and programs, referred to as the World Wide Web (WWW), was developed in the 1980's to govern the manner in which multimedia files are created and displayed on the Internet. The Internet and WWW provide a practical manner for on-line end users, for example, students, professionals and businessmen, to access a large, and increasing volume of information for purposes, such as, research, education and marketing of goods and services.

Users, on user computers, access the Internet and the WWW through host Internet providers, including, but not limited to, private Internet providers, for example, Netcom, or on-line providers, for example, America On-Line, or Prodigy. To access and view the desired information, users utilize browser, a computer program which enables the user to view information or files communicated over the WWW. Example browsers include, but are not limited to Microsoft Corporation's INTERNET EXPLORER, or those sold under the trademarks NETSCAPE NAVIGATOR, IBM EXPLORER and NSCA MOSAIC.

The Internet is based on a client/server architecture scheme, wherein some computers, such as user computers requesting or obtaining information, act as clients, and other computers, such as the computers which contain (or otherwise provide access to) the requested information, act as a servers. Both the browsers and the servers typically utilize a Hypertext Transfer Protocol (HTTP) to communicate with each other and the WWW. Users who are operating a browser request information, or data content, from the server through HTTP. The server responds and provides the content to the browser, barring any restrictions, through HTTP. The browser, in turn, provides the requested information to the user.

HTTP allows access to files using Hypertext Markup Language (HTML), where HTML is a standard page description language. Typically, pages of content, or web sites, which a user may access on the WWW, are written in HTML. HTML defines a document format for these pages and further allows links to be specified to and from these pages to other servers and files. Links are programming features included in a content page and, upon activation, direct other content, such as a further page or web site, to the user computer. Links may include, for example, indicia displayed as part of the content page and may be activated by the user, such as through a mouse button, keyboard or other user-input device. Thus, pages on web sites may include links which, in effect, direct the movement of users to other sites, content locations or pages and allow users to quickly jump from page-to-page or site-to-site. In addition, browsers typically include programming functions that allow a user to jump, for example, back or forward through pages or sites that the user had previously accessed, or to favorite sites, home pages or the like.

While the ability to quickly move from one page or site to another has significant advantages in many contexts, it can be difficult to obtain a user's attention for sufficient time to, for example, provide the user with important information. Indeed, other than a link to an additional page of information, a typical web site operator may not be able to effectively direct the information accessed by a user such that a user's attention can be directed to particular information considered to be important by the web site operator, for example, warning, health or safety information, advertising or promotional information, political or governmental information or the like. Indeed, conventional links are ineffective in that the user can quickly effectively jump to another page or site before obtaining or viewing the information at the linked page, by merely activating a browser function, for example, to return them to the page originating the link, or to access a new site altogether. Thus, a need in the industry exists to allow a provider of information to direct the content accessed by an end user, even if for a short time, so that predetermined information can be presented to the user.

SUMMARY OF THE DISCLOSURE

Embodiments of the instant invention are directed to a method, apparatus and system for directing an on-line user to predetermined information. Preferred embodiments of the instant invention interface with the user's browser utilizing the link keys representing the functions of the browser, and any other keys used for these functions, to direct user "traffic" on a network by controlling or interacting with the browser functions.

In preferred embodiments, when a user accesses, or enters, a web site page, a traffic control program is executed for the page. Once the user accesses the web site, the traffic control program controls the transmission (downloading) of data to the user computer 12, which results in the web site being displayed through the browser at the user computer, and further creates a modified set of rules for at least one of the browser functions. These modified rules override or modify the browser default or normal software rules for such functions.

In preferred embodiments, an end user requests content from the provider computer. The provider computer 14 responds to the user's request for content by transmitting, that is, downloading content data for one or more HTML frames, corresponding to the user-requested content. In addition, further software, for example, browser script is also transmitted or downloaded, preferably with the content data. Upon receipt of the content software data and the additional software, the user computer generates a display corresponding to the content data associated with the HTML frame. In addition, the user computer generates a second frame defined by the additional software. The HTML frame is perceivable (for example, viewable) to the user as the content requested by the user. The second frame, however, is preferably a hidden frame, which is not visible to the user, but is nonetheless, maintained as a frame with the user's browser. The hidden frame is a peer frame with respect to the content (or viewable HTML) frame, in that the browser interacts, at least first, with the hidden frame during, for example, exit procedures (when the user attempts to exit the web site or page). In this regard, the software downloaded to the user computer for generating the hidden frame includes executable code and commands that are designed to interact with the user's browser software (for example, upon the user's attempt to exit the displayed web page).

In one preferred embodiment, to access further (or previously accessed) content and, thus, exit the content currently being displayed, the user may select one of the browser functions. In response to the executed browser function, the browser executes a closing routine to, in effect, close the presently displayed frame, to display a further frame. The closing routine involves a query to (or other suitable interaction with) the open frame set; that is, the browser queries (or otherwise interacts with) the software associated with the dominant frame (the hidden frame) and the content (or HTML) frame for any final instructions, as both of these frames are open in the browser at the time at which the user attempts to exit the content (or HTML) frame. As the hidden frame is the peer frame, the browser queries (or otherwise interacts with) the hidden frame first. Upon query (or other interaction) by the browser prior to closing the frames, the software associated with the hidden frame executes in conjunction with the browser's frame-closing routine and interacts with the browser software. It should be appreciated that the order in which the frames are addressed can be different in other embodiments.

The software associated with the hidden frame, in effect, modifies or controls one or more of the browser functions, such that the user computer accesses a predesignated site or page (and displays a predesignated frame) instead of accessing the site or page typically associated with the selected browser function.

The displayed destination is dependant upon the executed browser function. In preferred embodiments, the software (or browser script) associated with the hidden frame includes routines for controlling which further content, site or page (further HTML frames) that will be downloaded to the user computer, based on which browser function is selected by the user. Any suitable script language that is compatible with browser software, such as Java Script, may be employed for interaction with the browser to effect such control of content downloaded to the user.

An object of preferred embodiments is to direct the on-line user's attention to predetermined information so as to increase the possibility of the user's interest in such information.

A further object of preferred embodiments is to generate traffic for web sites and other Internet properties, and to provide advertising and purchasing opportunities to the user.

An advantage to this object is that existing traffic on the web site can be leveraged such that traffic to one or more new destinations can be amplified.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

BRIEF DESCRIPTION OF THE DRAWINGS

The detailed description of embodiments of the invention will be made with reference to the accompanying drawings, wherein like numerals designate corresponding parts in the figures.

FIG. 4 is a block diagram of various links and pages according to an embodiment of the instant invention.

DETAILED DESCRIPTION OF PREFERRED EMBODIMENTS

Preferred embodiments of the instant invention employ a network of computers and programs for controlling one or more of such computers for directing access to content by users on the network.

Hardware Environment

Figure 1:
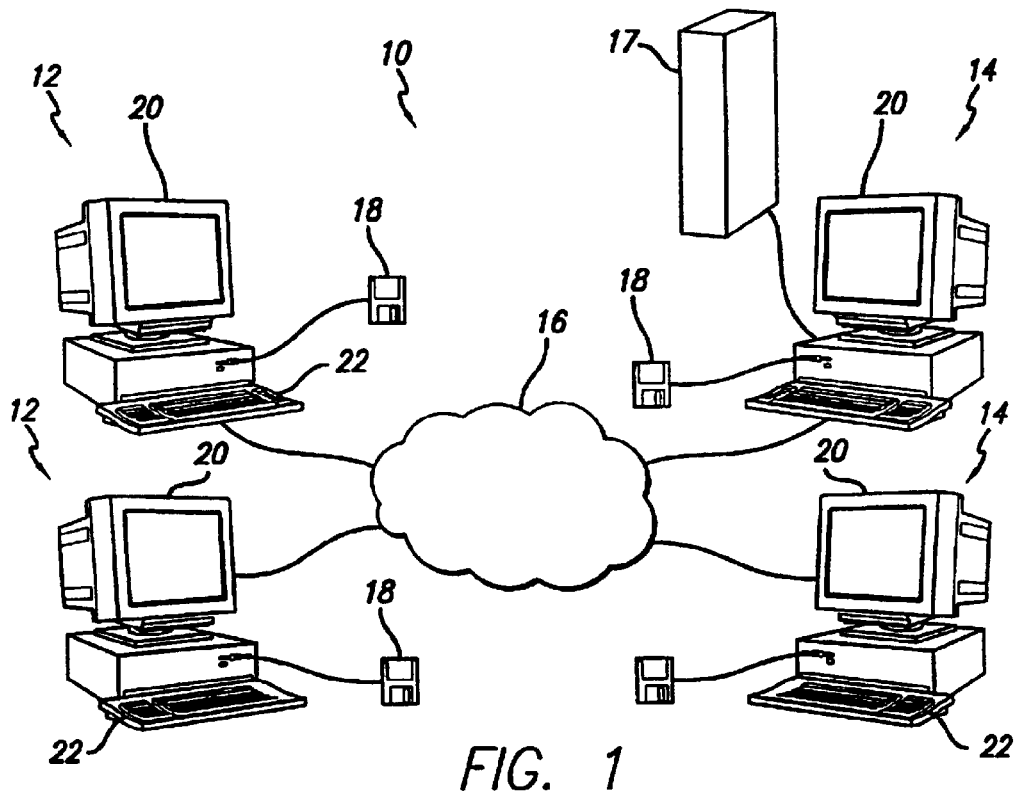
FIG. 1 is a network system environment in accordance with a preferred embodiment of the instant invention.

Preferred embodiments of the instant invention operate with a network comprising a plurality of networked computers, such as, for example, at least one user computer and at least one provider computer which are coupled together in a communications network, such as, for example, the Internet or WWW. FIG. 1 depicts a simplified representation of an example network system 10 that is operated in accordance with preferred embodiments of the invention.

The network system 10 includes at least one client or user computer 12 and at least one content provider or server computer 14 coupled for communication therebetween by the remainder of the network, generally represented at 16. In the illustrated embodiment, two client or user computers 12 and two content provider computers 14 are shown in the network system. It will be understood that further embodiments may employ any suitable number of user and provider computers. The network system 10 may comprise a closed or intranet configuration, an open or public-access network configuration or combinations of such configurations, as is well known in the art. For example, the user and provider computers 12 and 14 may be included in smaller, interconnected networks which compose the overall network system 10. In an Internet embodiment, the network system 10 comprises a combination of a large number of interconnected internets and intranets. For purposes of simplifying the present disclosure, the various hardware components (for example, host servers, routers, connectors) and software necessary for communication between computers on the network system are not described herein in detail. Such hardware and software are well within the scope of one of ordinary skill in the art and are at least partially dependent upon the type of network system employed and the desired application of use.

The user computer 12 may comprise any suitable network device capable of communicating with other network devices in the network system. In preferred embodiments, the user computer comprises a programmable processor capable of operating in accordance with programs stored on one or more computer readable media 18 (for example, but not limited to floppy disc, hard disc, computer network, random access memory (RAM), CD Rom, or the like), a display device 20 for providing a user-perceivable display (for example, but not limited to visual displays, such as cathode ray tube CRT displays, light-emitting-diode LED or liquid-crystal-diode LCD displays, plasma displays or the like, audio displays or tactile displays), and a user input device 22 (for example, but not limited to, a keyboard, mouse, microphone, or the like). In one preferred embodiment, the user computer comprises a personal computer system having a CRT display, a keyboard and a mouse user-input device.

Figure 2:
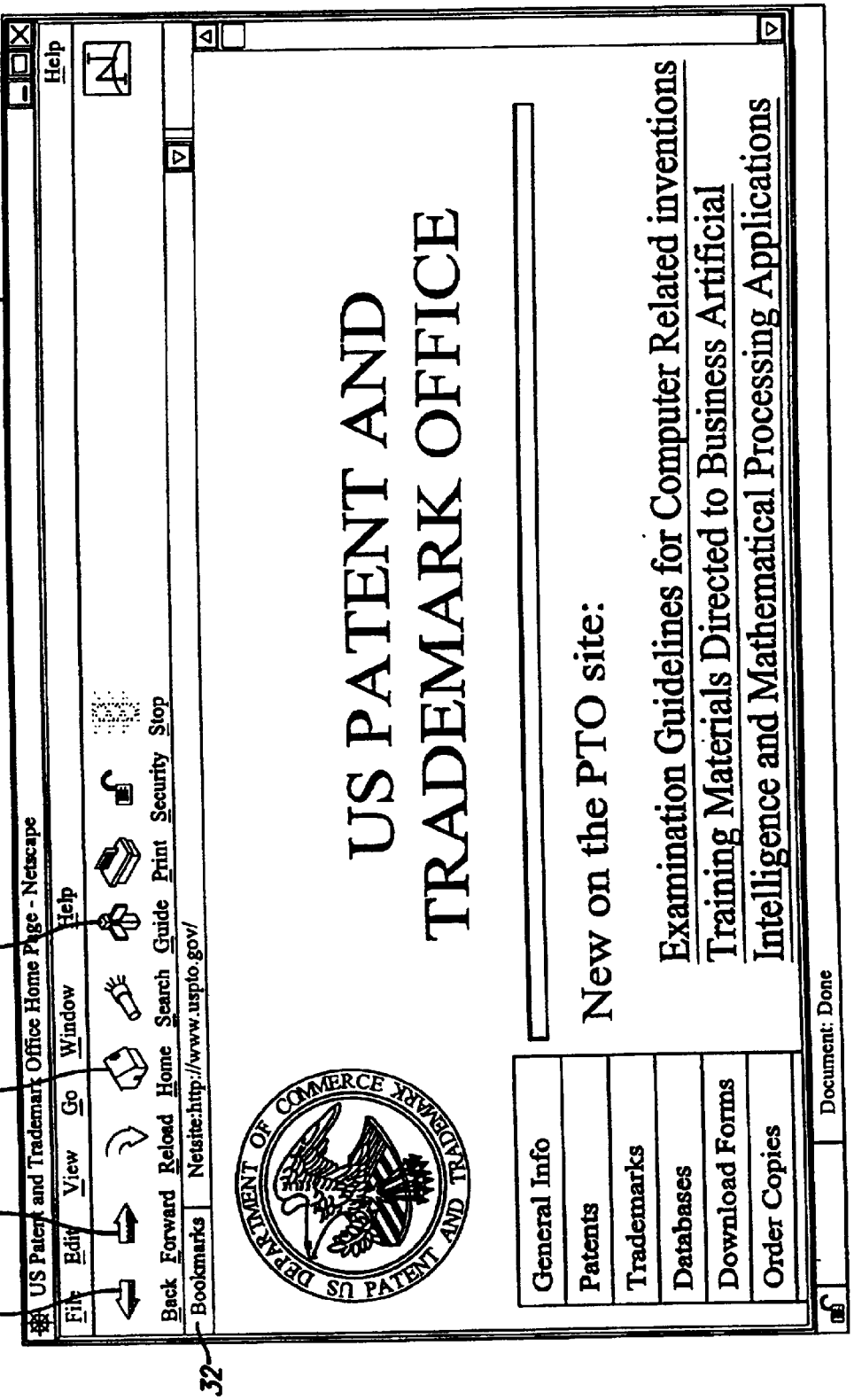
FIG. 2 is a display view of a sample browser page from the Internet, wherein the browser page includes function buttons.

The user computer 12 is controlled by suitable software, including network communication and browser software to allow a user to request, receive, and display information (or content) from or through a content provider computer 14 on the network system 10. In preferred embodiments, the user computer employs a program, such as a browser, for displaying content received from a provider computer 14. Typical browsers, such as, for example, one generating the Internet browser page 23 shown in FIG. 2, include a variety of user operable functions that facilitate the user's control of their communication path through a network, to control the user's access to content available on the network. Some of the typical user operated functions include, but are not limited to, Back 24, Forward 26, Home 28, an Address Location Slot 30, Bookmark 32 and Favorite Links 34 (not shown). These functions are depicted as link keys on the browser page 23 as shown in FIG. 2.

The Back 24, Forward 26 and Home 28 functions allow a user to return to a previously viewed page (Back 24 and Forward 26) or a predesignated page (Home 28). The Back 24 function allows the user to return to the web site page initially viewed directly before the current page and the Forward 26 function allows the user to return to a page which was initially viewed after the current page. Thus, for example, if a user has already viewed pages 1, 2, 3, 4 and 5, respectively, and the user is currently reviewing page 4, the Back 24 function allows the user to return to page 3 and the Forward 26 function allows the user to return to page 5. The Home 28 function returns the user to the home or introductory page of the browser, such as that shown in FIG. 2. The Address Location Slot 30 allows the user to input an address of a specific web page and locate themself to that page. Both the Bookmark 32 and Favorite Links 34 functions allow the retrieval of a saved address of a web page.

The content provider computer 14 may comprise any suitable network device capable of providing content (data representing text, hypertext, photographs, graphics, video and/or audio) for communication over the network. In preferred embodiments, the provider computer comprises a programmable processor capable of operating in accordance with programs stored on one or more computer readable media 18 (for example, but not limited to, floppy disks, hard disks, random access memory RAM, CD-ROM) to provide content for communication to a user computer 12. The provider computer may comprise, for example, but is not limited to, a personal computer, a mainframe computer, network computer, portable computer, personal data assistant (such as, a 3Com Palm Pilot), or the like. The provider computer 14 may include one or more internal data storage devices (not shown) for storing content for communication to a user computer 12. Alternatively, or in addition, the provider computer 14 may be coupled to an external data storage device, computer, or other means, generally represented at 17, from which the provider computer 14 may obtain content for communication to a user computer 12. In one embodiment, the external device 17 may comprise a further network device coupled in the network 16.

The content provider computer 14 is controlled by suitable software to provide the requested content to the requesting user computer 12, provided that various criteria are met. In addition, in accordance with preferred embodiments of the present invention, the provider computer 14 is also controlled by software to provide control instructions, routines or programs for communication to a user computer 12, for directing the user computer's access to further information (content) according to processes as discussed in more detail below.

In a preferred Internet environment, the content provider computer 14 is controlled by suitable software to respond to a valid request for content by providing (or downloading) data in the form of one or more HTML files to the user computer 12 from which the request was made. It will be understood by those skilled in the art that this process involves communications through suitable servers, routers and other components, as is dictated by the particular network environment.

The HTML file(s) correspond to one or more HTML frames which, in conjunction with the browser software at the user computer 12, is displayable on the display device at the user computer as text, hypertext, photographs, graphics, sound, or the like, in a form that is perceivable to the user. Upon receiving the HTML file(s) and displaying HTML frames, the user is said to have "entered" the web site or page corresponding to the HTML file. Thereafter, the user may desire to "exit" the web site or page, for example, by requesting and downloading (or entering) a further web site or page.

In typical Internet and other network transactions, the HTML frame data (or data in other suitable formats) downloaded from the provider computer 14 to the user computer 12 is accompanied by further software, such as browser script, for interacting with browser functions at the user computer. Software features commonly included with such browser script include features for interacting with the browser software during an exit procedure, that is, when the user is exiting a web site or page. As part of the exit procedure, the browser and the browser script software interact in a manner, as well known in the art, such that the browser script receives exiting instructions from the browser to close or dispose of additional computer resources that may have been accessed, such as, memory, graphic images or connections to data bases. As described in more detail below, preferred embodiments of the present invention involve the inclusion of software, routines, for example as part of (but not limited to) browser script, for controlling the user computer's access to further data (for example, further HTML files) during an exit procedure. In example embodiments as described in further detail below, the user is, in effect, directed to one or more web sites or pages dictated by the browser script (or other suitable software), instead of, or in addition to, the site or page specifically selected by the user when exiting from the displayed site or page.

General Description of Preferred Embodiments

Preferred embodiments of the instant invention utilize the link keys representing the above described functions of the browser, and any other keys used for these functions, for example, the close key or embedded hypertext, to direct user "traffic" on a network and, more preferrably, on the Internet, by controlling or interacting with the browser functions. Traffic is generally understood as the volume of users accessing a given site over a given period of time. Thus, for example, with relation to a particular Internet site, traffic on the site is typically a reference to the movement of users to and from the site, that is, the number of users accessing and disconnecting from the particular site.

By directing traffic, preferred embodiments of the instant invention generate traffic for other web sites, web site collections, pages and other network (or, preferably, Internet) properties, such as, for example, www.apple.com, www.webjump.com. The direction of the traffic allows existing traffic on network sites to be leveraged such that traffic to new destinations can be amplified. While embodiments of the invention may apply to various forms of communication networks, for purposes of simplifying the present disclosure, preferred embodiments are described herein, primarily with relation to the Internet. However, insofar as the claims are not limited by express language requiring the Internet environment, such claims are not intended to be limited to involve the Internet as the communication network.

In preferred embodiments, when a user accesses, or enters, a web site page, a traffic control program is executed for the page. Although a user does not physically move when entering or leaving a web site, it is generally understood that the accessing of a web site, or disconnection therefrom, is referenced as any term which connotes movement to and from a particular place, including, but not limited to, entering, traveling into, going to, leaving, exiting and visiting a web site. Once the user accesses the web site, the traffic control program controls the transmission (downloading) of data to the user computer 12, which results in the web site being displayed through the browser at the user computer, and further creates a modified set of rules for at least one of the browser functions. These modified rules modify or override the browser software rules for such functions.

Figure 3:
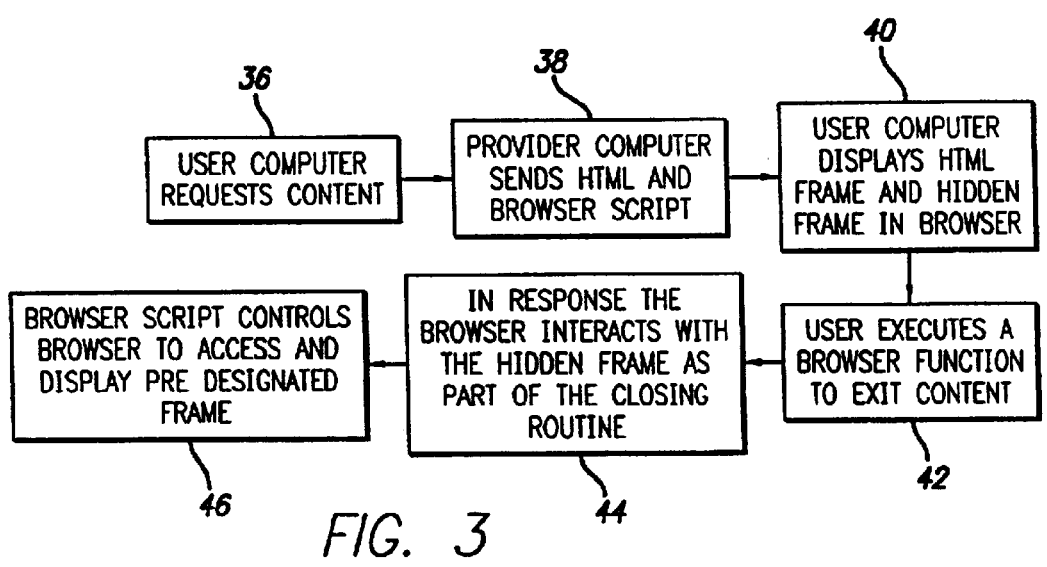
FIG. 3 is a block diagram of an interaction between the user computer and the provider computer according to an embodiment of the instant invention.

With reference to block diagram flow-chart of FIG. 3, in preferred embodiments, an end user requests content from the provider computer 14, as represented by block 36. In block 38, the provider computer 14 responds to the user's request for content by transmitting, that is, downloading, content data, for example, but not limited to, data for one or more HTML frames, corresponding to the user-requested content. In addition, further software, such as, browser script is also transmitted or downloaded, preferably with the content data. Technology and procedures for downloading of data (such as HTML frame data and further software, such as browser script) from one network site to another is well within the scope of those skilled in the art, and thus, is not discussed in further detail herein.

Upon receipt of the content software data (for example, HTML frame data) and the additional software (for example browser script), the user computer 12 generates a display corresponding to the content data (for example, by displaying visual images) associated with the HTML frame. In addition, the user computer 12 generates a second frame defined by the additional software. The display of these frames is represented by block 40 in FIG. 3. The content (or HTML) frame and the second frame define a frame set. As understood by one skilled in the art, the HTML frame is perceivable (for example, viewable) to the user as the content requested by the user. The second frame, however, is preferably a hidden frame, which is not visible to the user, but is nonetheless, maintained as a frame with the user's browser. The hidden frame is a dominant frame with respect to the content (or viewable HTML) frame, in that the browser interacts, at least first, with the hidden frame during, for example, exit procedures (when the user attempts to exit the web site or page). In this regard, the software downloaded to the user computer for generating the hidden frame includes executable code and commands that are designed to interact with the user's browser software (for example, upon the user's attempt to exit the displayed web page).

In one preferred embodiment, to access further (or previously accessed) content and, thus, exit the content currently being displayed, the user may select one of the browser functions (discussed below), as represented by block 42 in FIG. 3. Thus, for instance, a user may select a Back function of the browser. In response to the executed browser function, for example, a Back function, the browser executes a closing routine to, in effect, close the presently displayed frame, to display a further frame. The closing routine involves a query to (or other suitable interaction with) the open frame set; that is, the browser queries (or otherwise interacts with) the software associated with the dominant frame (the hidden frame) and the content (or HTML) frame for any final instructions, as both of these frames are open in the browser at the time at which the user attempts to exit the content (or HTML) frame. As the hidden frame is the dominant frame, the browser queries (or otherwise interacts with) the hidden frame first. Upon query (or other interaction) by the browser prior to closing the frames, the software associated with the hidden frame executes in conjunction with the browser's frame-closing routine and interacts with the browser software, as represented by block 44 in FIG. 3.

The software associated with the hidden frame, in effect, modifies or controls one or more of the browser functions, for example, the Back function (discussed below), such that the user computer accesses a predesignated site or page (and displays a predesignated frame) instead of accessing the site or page typically associated with the selected browser function.

The displayed destination is dependant upon the executed browser function. In preferred embodiments, the software (or browser script) associated with the hidden frame includes routines for controlling which further content, site or page (further HTML frames) that will be downloaded to the user computer, based on which browser function is selected by the user. Any suitable script language that is compatible with browser software, including, but not limited to, Java Script, JScript and Visual Basic Script, may be employed for interaction with the browser to effect such control of content downloaded to the user.

Thus, for instance, the software (or browser script) may include routines for directing the user's computer to access (enter) a first predefined content, such as a first web site or page, in response to the user's selection of a first browser function. In further preferred embodiments, the software (or browser script) may include routines for directing the user's computer to access (enter) a second predefined content (site or page), in response to the user's selection of a second browser function, where the second content is different than the first content and the second browser function is different than the first browser function. Likewise, third and further content (sites or pages) may be accessed (entered) in response to the user's selection of third or further browser functions. Thus, for example, if the Back function is selected by the user, the software may direct the display of destination A; if the Forward function is selected the software may direct the display of destination B; and if the Exit function is selected the browser may be directed to display destination C. Any combination or choices of destinations can be made.

With reference to FIG. 4, in preferred embodiments, a user connects to a initial page or start page 48. The start page 48 is an introductory page which can include, but is not limited to, descriptive information regarding the web site, sales or promotional information, links for accessing related information and graphics. The start page 48 further includes at least one traffic controlled link 50 and at least one non-traffic controlled link 52.

In preferred embodiments, the traffic controlled link 50 is a hyperlink written, for example, in HTML language, that connects the user to another page of information, wherein the page that the user is connected to is predetermined by the provider computer 16. The traffic controlled link 50 is coupled to one of the browsers functions that are operable pursuant to the modified set of rules created by the traffic control program. The hyperlink destination may be a part of the web site that the user is currently visiting, an entirely new site, or a prior destination that the user has previously visited. Traffic controlled links 52 can be coupled to or associated with any function of the browser desired to be controlled, including, but not limited to, Back 24, Forward 26, Home 28, Address Location Slot 30, Bookmark 32, Favorite Links 34, Exit 54, and the operation of opening a new browser window.

The non-traffic controlled link 52 is any of the browser functions that are not operable by the modified set of rules created by the traffic control program. The non-traffic controlled links 52 allow the user to exit the web site pursuant to the rules generally operating for these functions without being directed to the provider's predetermined information.

With reference to FIG. 4, a user enters the start page 48 of the web site according to conventional network access procedures, wherein the start page 48 includes traffic controlled links 50 and non-traffic controlled links 52. In preferred embodiments, the user cannot distinguish a traffic controlled link 50 from a non-traffic controlled link 52. If a user decides to exit the web site, the user may do so by any hyperlink button associated with the web site, or may do so by any one of the browser functions that are non-traffic controlled links 52.

For instance, and as illustrated in FIG. 4, the Back 24 function and the Exit 54 function of the browser are traffic controlled links 50, and thus, subject to modified rules of operation. In this embodiment, if the user activates the Back 24 function, the user does not connect to the previously viewed page; rather, the user connects to site A. Similarly, if the user attempts to exit the web site currently being viewed via the Exit 54 function, the user will be directed to site B. Sites A and B can be any location predetermined by the provider, including, but not limited to, a part of the current site, for example, a different page; a different site; or a previously viewed site. In some embodiments, one or both of sites A and B contain traffic controlled links 50 such that the communication link of the user can be further directed. In other preferred embodiments, neither site contains traffic controlled links 50 such that the user's communication link is no longer directed.

In this embodiment, site A includes a traffic controlled link 50, that is, the Back 24 function. If the user attempts to exit site A via the Back 24 function, the user will be directed to site E. Site E contains no traffic controlled links 50, and thus, the user is able to exit site E in a manner consistent with the function engaged by the user. If instead of activating the Back 24 function from site A, the user activates any other browser function, the user will exit site A in a manner consistent with the function engaged by the user.

Again referring to the user exiting the web site from the start page 48, if the user activates the Home 28 or Bookmark 32 functions, the user is directed to sites C and D respectively. Sites C and D are destinations from non-traffic controlled links 52, and thus, the user is directed to the home page of the browser (site C) or the page representative of the chosen bookmark site (site D). By activating one of the non-traffic controlled links 52, that is, a non-traffic controlled browser function, the user exits the web site in the manner consistent with the mode of operation typically associated with these functions.

Figure 5:
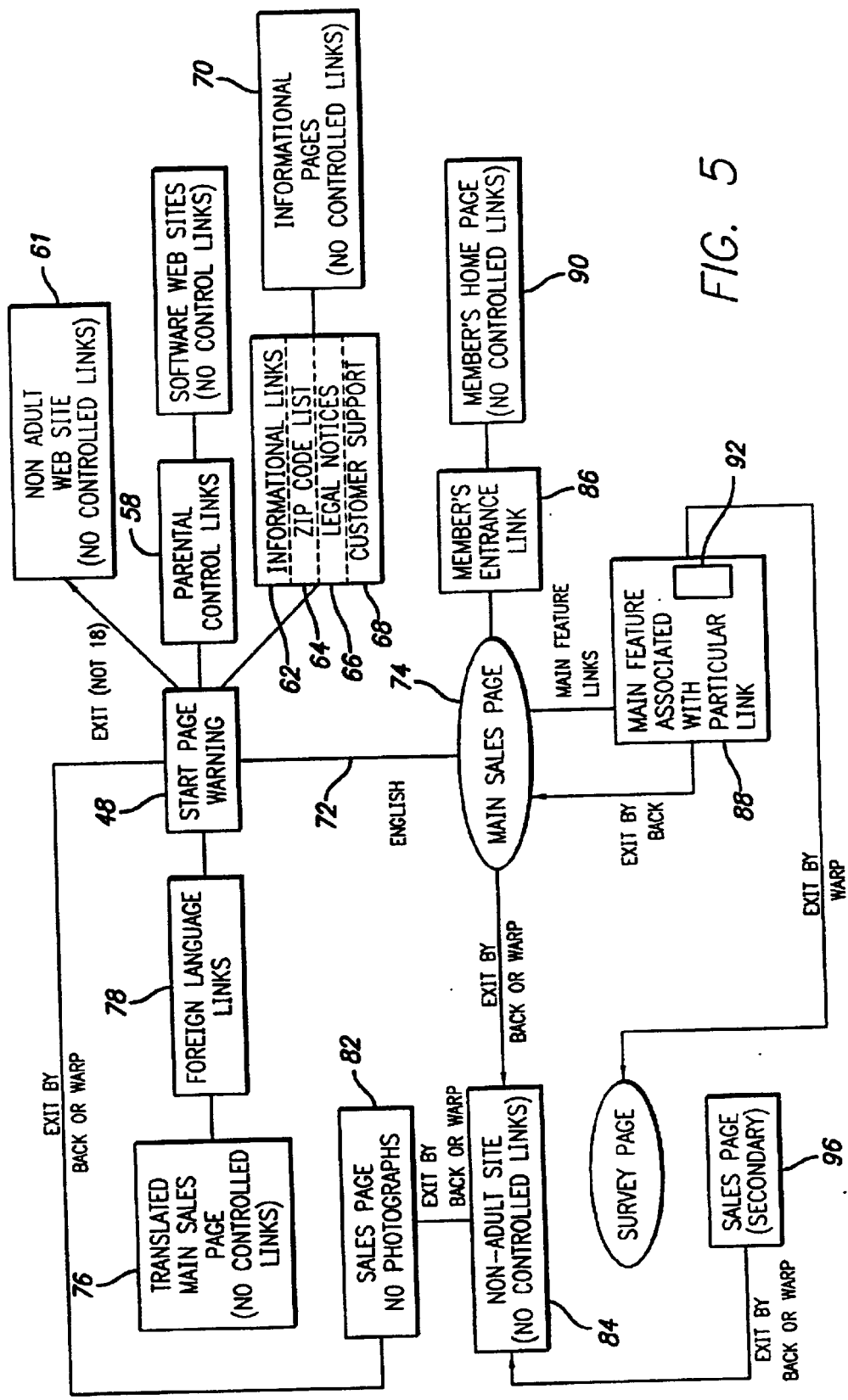
FIG. 5 is a block diagram various links and pages according to another embodiment of the invention.

FIG. 5 is a block diagram of another preferred embodiment of the instant invention. In this embodiment, the web site is a sales presentation, wherein the user is solicited to register as a member of the site which allows the user access to the content of the web site. In one preferred embodiment, the web site provides adult content, although the web site can contain any type of information that the provider is desirous of presenting to the user.

Similar to other preferred embodiments, the adult content web site includes a start page 48. Due to the specific content of the adult site, the start page 48 is a warning page, wherein the user is required to affirm their legal age and/or provide other information which is designed to prevent unauthorized viewing by targeted audiences; namely, persons under a legally defined age, which is currently set at 18 years of age.

The user enters the start page 48 via a search engine 56, such as, for example, Yahoo, or through a provider banner 56, such as, an advertising link specific to the provider. The start or warning page 48 presents information for the user prior to accesssing the site, such as, warning information regarding the data content of the site. The start page 48 further includes traffic controlled links 50 and non-traffic controlled links 52.

Various non-traffic controlled links 52 are included on the web site, in part, to prevent unauthorized viewing of the content. In preferred embodiments, the non-traffic control links 52 include the Exit 54 function, a plurality of parental control links 58 and a plurality of legal/information control links 60.

A viewer who indicates that they are not 18 years of age, or who activates the Exit 54 function hyperlinks to a first non-adult new web site 61. The first non-adult web site does not contain adult content and is not traffic controlled or destination controlled. In preferred embodiments, the first non-adult web site is any non-adult, non-traffic controlled site, such as, for example, another provider, or non-provider, site having, for example, sports or music content. Once the user exits the web site via the Exit 54 function, the user's communication link is not controlled and the user is free to connect with any location chosen by the user.

In addition to the Exit 54 function, the web site includes a plurality of parental control links 58. The user accesses the parental control links 58 by a browser link. The parental control links 58 send a user to the home site of the manufacturers of a filtering software. The filtering software is designed to prohibit users from accessing the content on the adult web site. The parental control links 58 are non-traffic control links 52. As such, once the user exits the adult web site via the parental control links 58, the user can freely choose his next destination.

The legal/information control links 60 are accessed by a browser link. The legal/information control links 60 further include informational link 62, territorial link 64, legal notice link 66 and customer support link 68. Each legal/information control link 60 connects the user to an information page 70 that is associated with the particular link.

For instance, the informational links 62 connect the user to an information page(s) 70 which provide information related to the web, such as, for example, terms and conditions for membership. The territorial link 64 connects the user to an information page 70 that includes information regarding the locations where the adult content can legally be downloaded, such as, for example, a zip code list. The legal notice link 66 connects the user to various legal notices regarding the state of the law on pertinent issues, such as, for example, copyright and trademark laws. The customer support link 68 connects the user to information regarding obtaining or connecting to customer support. None of the legal/information control links 60 are traffic controlled destinations such that the user is free to exit the destination to a user desired location or reenter the adult web site start page 48.

The traffic control links 50 contained on the warning page 48 comprises a sales link 72 that directs the user to the main sales page 74 for the site. Information contained on the warning page 48 also allows the user to access a translated main sales page 76 via a foreign sales link 78. The main sales page 74 has been translated into various languages, including, but not limited to, German, French, Spanish and Italian. It is to be appreciated that the main sales page 74 can be translated into as many languages as desired.

If the user activates the foreign sales link 78, the user will be connected to the associated translated foreign sales page 76. The foreign sales pages 76 do not contain traffic control links 50. Thus, a curious user or one who has accidently activated the link 78 can easily return to the starting page 48.

To access an English version of the main sales page 74, the user selects a main Entry link 72. The main sales page 74 comprises adult content, such as, photographic content, and a second warning regarding the nature of the content on the web site. The main sales page 74 provides the user with promotional and sales information which attempts to get the user to purchase a membership in the web site. As previously stated, the membership allows the user to access the data content of the web site.

If the user attempts to exit the main sales 74, or foreign sales page 76, by activating the Back 24 function, or by any means of exiting the site that is not the Back 24 function, known as Warp 80, the user is directed to a modified sales page 82. The modified sales page 82 is a substantial duplicate of the main sales page 74 without the photographic material. The modified sales page 82 provides the user another opportunity to purchase a membership in the web site. If the user again decides not to purchase the membership and exits the site via the Back 24 function or the Warp 80 function, the user is directed to a non-traffic controlled destination 84. The non-traffic controlled destination is any provider or non-provider site which comprises any type of non-adult content data, such as, for example, music, sports or news.

The main Entry link 72 directs the user to the English page version of the main sales page 74. This main sales page 74 further comprises an Entrance link 86 and a plurality of main feature links 88. The Entrance link 86 connects users, who are current members of the web site, to a member's home page 90.

If the user attempts to exit the main sales page 74 via the Back 24 function or the Warp 80 function, the user is directed to a Survey page 94. The survey page 94 is a page that is designed to obtain information from the user. The questions included on the survey page 94 can include any type of information that the provided desires for any given purpose. Further, in some preferred embodiments, the survey page 94 comprises other information, such as, for example, incentives or offers. For instance, in one preferred embodiment, the survey page 94 requests information that is directed to obtain information as to why the user declined the purchase of a membership. Additionally, the survey page 94 offers the user an upgraded membership, at a discount, for answering the listed questions.

If the user completes the survey page 94, that is, answers the questions, the user is directed to the members' home page 90. If the user fails to complete the survey page 94 and attempts to exit the survey page 94 by any means other than completing the survey, for example, by Exit 54 or Warp 80, the user is directed to a secondary sales page 96. If the user again declines the purchase a membership, the user is directed to the non-traffic controlled destination 84. As with all non-traffic controlled destinations, the browser functions operate in a manner consistent with their expected uses and the user is free to move to a chosen destination.

The main feature links 88 on the main sales page 74 are links that are associated with specific features contained on the web site. If the user activates one of the plurality of main feature links 88, the user is directed to a sign-up page 92 for the feature associated with the specific main feature link 88 activated. The sign-up page 92 allows the user to purchase a membership in the web site. If the user decides not to purchase a membership, the user will exit the sign-up page 92. If the user exits the sign-up page 92 via the Back 24 function, the user is directed back to the main sales page 74 on the premise that the user is desirous of more information prior to purchasing a membership. Once at the main sales page 74, the user is subjected to the traffic control links 50 as previously described.

If the user exits the sign-up page 92 via the Warp 80 function, the user is directed to the survey page 94. The user is then subject to the traffic control functions associated with the survey page 94. The user's communication link is then controlled in the manner described above with respect to the survey page.

Although the preferred embodiments have been described with a particular number of traffic control links and non-traffic control links, it is to be understood that embodiments of the instant invention can be configured to include any number of traffic control links and non-control links. Further, embodiments of the instant invention are not limited in the number of destinations to which the user is sent. Indeed, the provider can configure a simplistic controlled pathway for the user, or a complicated pathway. The configuration of the user's communication pathway is dependent upon the needs of the provider. Further, the information the user is directed to can include any type of information desired by the provider, and thus, is not limited to the examples described herein. An example of suitable procedures and instruction for an HTML programmer to implement an Internet-based system according to one preferred embodiment of the invention is described in the attached appendix, which is incorporated herein by reference.

Further, although foregoing examples have been made with reference to adult content based web sites, it is not intended to limit the invention. Rather, the disclosure it is intended to include other preferred embodiments encompassing other types of content to which a user can be sent. Further, it is to be understood that the links described in the above embodiments are not intended to limit the invention. Indeed, embodiments of the invention can exclude any of the above described links or include any other type of link. As such, the foregoing is intended to cover all modifications and alternative constructions falling within the spirit and scope of the invention.

The Mousetrap
For HTML Designers

1. Audience and Scope
This guide is for those familiar with HTML but not with SML or JavaScript. It will allow taking an existing mousetrap and modifying it so it can be applied to a different site.

2. Operation
The first two sections of *The Mousetrap Programmer's Guide* can be read by a non-programmers for a description of the mousetrap mechanism. "The Mousetrap Effect" describes the action of the mousetrap from a user's point of view and "Operation Overview" discusses the sequence of events which occur when the browser's back button is pressed or a link is clicked. Also, check the "Mousetrap Flow Drawing" on page 16 to see how a mousetraps flow works.

3. Mousetraping In A Nutshell
In a nutshell, to apply the mousetrap to a non-mousetrap sales site, do the following:

1. Copy & rename the necessary files (section 7).
2. Make sure the ..._tail.htm file copied from above has the proper directory for the legal section (see end of section 6).
3. Insert the proper file names in the frameset page (section 5).
4. Copy the SML at the very top of the page and JavaScript between the </title> and </head> from parallel pages in a mousetrap (for example, copy the SML and JavaScript from the Sex Museum softsales page to the new softsales page.
5. Make sure all links in parallel pages have the JavaScript (onClick, onMouseOver, onMouseOut) and SML tags (including the feeders on the links to the registration pages).
6. Copy the SML conditional for the button/submit-button on the registration pages from mousetrap registration pages (see section 8.4).
7. Perform the tests in the "Testing" section (page 11). If there are problems, go to the "Troubleshooting" section (page 13).

IMPORTANT NOTE: When copying anything from an existing mousetrap to a new mousetrap, load the existing mousetrap file in your editor to copy data. DO NOT COPY BY VIEWING PAGE SOURCE IN YOUR BROWSER... SML COMMANDS WILL NOT BE COPIED.

The Mousetrap For HTML Designers

1. AUDIENCE AND SCOPE ............................................................................................................. 1
2. OPERATION ................................................................................................................................ 1
3. MOUSETRAPING IN A NUTSHELL ............................................................................................ 1
4. COPY FILES ................................................................................................................................ 2
5. THE FRAMESET PAGE ............................................................................................................... 2
    *5.1.1. Warning Page* ....................................................................................................................... 2
    *5.1.2. defaultStatusMsg* ................................................................................................................. 2
    *5.1.3. Hidden Pages* ....................................................................................................................... 2
    *5.1.4. Netscape 2 Kludge* ............................................................................................................... 2
6. WARNING PAGE ........................................................................................................................ 3
7. FIRST SALES PAGE .................................................................................................................... 4
8. REGISTRATION PAGE ............................................................................................................... 5
   8.1. SML ........................................................................................................................................ 5
   8.2. JAVASCRIPT ......................................................................................................................... 5
   8.3. MEMBERSHIP CODES ......................................................................................................... 5
   8.4. SUBMIT BUTTON ................................................................................................................. 6
9. THE SECOND SALES (SURVEY) PAGE ...................................................................................... 6
   9.1. DATA NOT STORED ............................................................................................................. 6
   9.2. DATA STORED ..................................................................................................................... 7
10. THE ALLSITES PAGE ................................................................................................................ 7
11. SOFTSALES PAGE .................................................................................................................... 8
12. BANNERS PAGE ........................................................................................................................ 9
   12.1. LINKS ................................................................................................................................... 9
   12.2. JAVASCRIPT ....................................................................................................................... 9
      *12.2.1. Always Directed to PG Website* ........................................................................................ 9
      *12.2.2. Not Always Directed to PG Website* ............................................................................... 10
13. TESTING .................................................................................................................................. 11
   13.1. GET A LINK TO THE MOUSETRAP ................................................................................. 11
   13.2. TEST ALL LINKS ............................................................................................................... 11
   13.3. TEST BACK & WARP ON ALL PAGES ........................................................................... 11
   13.4. VERIFYING THAT PARAMETERS ARE PASSED .......................................................... 12
   13.5. REGISTER SOMEBODY .................................................................................................... 12
14. TROUBLESHOOTING ............................................................................................................. 13
   14.1. PARM6, 18, OR 22 MISSING ............................................................................................. 13
      *14.1.1. Check The Warning Page* ................................................................................................. 13
      *14.1.2. Check the Sales Page URL* ............................................................................................... 13
      *14.1.3. Check the Sales Page Links* .............................................................................................. 14
      *14.1.4. Check the Registration Page* ............................................................................................ 14
   14.2. BACK OR WARP IS DOESN'T WORK ............................................................................. 14
15. ESOTERICA ............................................................................................................................. 15
   15.1. HOSTS FILE ....................................................................................................................... 15
   15.2. STARTING THE MOUSETRAP ON A NON-WARNING PAGE ...................................... 15
16. MOUSETRAP FLOW DRAWING – FLOW CHART FOR SEX ROULETTE ........................... 166

4. Copy Files

The first step to brewing up a mousetrap is to copy files from an existing mousetrap to the new mousetrap directory. If we were copying from Sex Museum, the following files would be copied:

1. mmuse_index.sml
2. mmuse_hidden1.sml
3. mmuse_hidden2.sml
4. mmuse_tail.htm

We would then rename them appropriately. For example, for Video Sex Channels, the frameset page might be renamed "mvsc_index.sml".

5. The Frameset Page

Various file names need to be entered in this page to customize the mousetrap to a particular sales site.

This page typically ends in "index.sml". For example, Sex Museum's frameset page has the filename of "mmuse_index.sml".

5.1.1. Warning Page

At line 5 of the frameset page, the following needs to have the file name entered for the warning page:

<$if cond:l.goTo val:.goTo="mmuse_warning.sml"><$endif>

The above setting is used for the warning page in Sex Museum.

5.1.2. defaultStatusMsg

This constant needs to be set with the message desired on the bottom of the browser's window. The following default message was used for Sex Museum:

defaultStatusMsg="Welcome to Sex Museum";

5.1.3. Hidden Pages

Two constants must be changed to reflect the file names of the hidden files. For example, for the Sex Museum, the following names are used:

hidden1="mmuse_hidden1.sml";
hidden2="mmuse_hidden2.sml";

*Also note that the hidden1 file needs to be set in the frameset definition itself at line 84.*

5.1.4. Netscape 2 Kludge

The defaultWarpTo constant is used because of a problem with Netscape 2. The following line needs to be set to the "warpTo" value in the first sales page (the page you come to after you click the "Enter" off the warning page).

defaultWarpTo="mmuse_survey.sml

6. Warning Page

This page contains 4 lines of JavaScript that will occur on all pages (except the registration pages).

```
parent.backTo="mmuse_softsales.sml";
parent.warpTo="mmuse_softsales.sml";
window.defaultStatus=parent.defaultStatusMsg;
parent.loadPage();
```

The "parent.backTo" needs to be set to the page you need to go to when the user hits the browser's back button. The "parent.warpTo" needs to be set to the page you need to go to when the user tries to go to a new location via bookmarks, history list, or typing in a new URL. The "window.defaultStatus" line sets the default of the browser's status line to "defaultStagusMsg" value set in the frameset page. The last line runs the "loadPage()" method in the parent which loads a file into the hidden frame.

All links on the warning page need to have the following line in them:

```
OnClick="parent.clicked(this)"
```

In addition, a mouse over message can be associated with the link by adding the following JavaScript to the link:

```
OnMouseOver="return parent.setStatus('I agree')"
OnMouseOut="return parent.setStatus('')"
```

The footer also needs to manually be added to the warning page and *every other page* in the mousetrap. For example, the following is used on Sex Museum:

```
<#INC."d:/http/sexmuseum/mmuse_tail.htm"#>
<table width=610 border=0>
  <tr>
    <td>
    <ul>
      <pre><#MAC.NBHOST#></pre></font>
    </ul>
    </td>
  </tr>
</table>
</HTML>
<$exit>
```

The line with "d:/http/sexmuseum/mmuse_tail.htm" would change with another site. For example, at XXX Sex Photos, the line would change to "d:/http/xxxsexphots/mxsp_tail.htm".

7. First Sales Page

This page is loaded after "Enter" on the warning page is clicked. The top of this page needs the following SML line:

<#MAC.visit#>

This page has the same JavaScript as the warning page except that the following line is added:

parent.enterClicked=true;

This is a variable to let other pages know that the user has clicked the "Enter" key.

As discussed in the warning page, links to the "age verification" or registration pages need to have the following JavaScript:

OnClick="parent.clicked(this)"

The SML feeders need to be correct on these links as well to ensure proper statistics. The following is a correct feeder example from Sex Museum:

feeder=MMUSE_sales_1_Live-<#MAC.NBHOST#>&<#SID=.#>&bid=<#.bid#>

The link to the members and webmaster areas need to have the following in order to remove the frameset when entering these areas:

target="_top" OnClick="parent.clicked(this)"

Again, all links can make use of the mouse over events for links:

OnMouseOver="return parent.setStatus('Members Enter Here')"
OnMouseOut="return parent.setStatus('')"

8. Registration Page

8.1. SML

The SML for this page should be copied from an existing mouse trap registration page:

```
<$assign val:SID.mm="apps.xpics.com">
<$if cond:.free!=CHECKED cond:.mall!=CHECKED val:.m90=CHECKED><$endif>
<$if cond:.bid val:.acb=.bid><$endif>
```

The second line above sets the default membership to the 90 Day membership.

8.2. JavaScript

The JavaScript for this page is different than previous pages:

```
<script language="JavaScript">
<!-- Script start
  var isSent = 0;
  parent.newWin=true;

function load()
  {
    window.defaultStatus=parent.defaultStatusMsg;
  } function SubmitData( form )
  {
    parent.newWin=false;
    if( !isSent )
    {
      isSent = 1;
      form.submit( );
    }
  }
// Script end -->
</script>
```

8.3. Membership Codes

The following three lines are specific to each site:

```
<INPUT TYPE="radio" NAME="PARM13" VALUE="SEXM-FR" <#.free#>>
<INPUT TYPE="radio" NAME="PARM13" VALUE="SEXM-90" <#.m90#>>
```

The "SEXM-FR" and "SEXM-90" is specific to Sex Museum. For example, the lines in all XXX Sex Photos registration pages are the following:

```
<INPUT TYPE="radio" NAME="PARM13" VALUE="SEXRXX-FR" <#.free#>>
<INPUT TYPE="radio" NAME="PARM13" VALUE="SEXRXX-90" <#.m90#>>
```

8.4. Submit Button

The submit button needs to look something like the following:

```
<$if cond:SID.js>
<CENTER><input type="button" value="Submit Information" onClick="SubmitData( this.form )"></CENTER>
<$else>
<CENTER><input type="submit" value="Submit Information"></CENTER>
<$endif>
```

The SML conditional <$if cond:SID.js> needs to be used on a mousetrap registration pages. The SML conditional <$if cond:MAC.user_agent LIKE "Mozilla/[2-9]"> is only used on non-mousetrap registration pages.

9. The Second Sales (Survey) Page

This page has a form on it and has JavaScript which should be copied from another survey page. Currently the information entered in the survey is being thrown away. In development, we have a survey page which will store data in SQL Server. We will describe these two variations and their setup:

9.1. Data Not Stored

For the survey form that throws away user entered data, the following lines are used near the HTML "form" command:

```
1. <form name="qForm" method=post action="mmuse_allsites.sml">

2. <input type=hidden name="feeder" value="MMUSE_survey-<#MAC.NBHOST#>">
3. <input type=hidden name="referer" value="<#SID.referer#>">
4. <input type=hidden name="bid" value="<#.bid#>">
```

The first line above needs to have the appropriate "allsites" registration page. For example, for XXX Sex Photos, the line should have action="mxsp_allsites.sml".

The second line should have the appropriate feeder. For XXX Sex Photos, it would be value="MXSP_survey-<#MAC.NBHOST#>". The remaining lines would not be altered.

9.2. Data Stored

For the survey form that stores user entered data, the following lines are used near the HTML "form" command:

```
1. <form name="qForm" method=get action="http://apps.xpics.com/cgi-bin/survey.pl">

2. <input type=hidden name="feeder" value="MMUSE_survey-<#MAC.NBHOST#>">
3. <input type=hidden name="referer" value="<#SID.referer#>">
4. <input type=hidden name="bid" value="<#.bid#>">

5. <input type=hidden name="table_name" value="survey_response">
6. <input type=hidden name="redirect" value="http://www.sexmuseum.com/mmuse_allsites1.sml">
```

The second line should have the appropriate feeder. For XXX Sex Photos, it would be value="MXSP_survey-<#MAC.NBHOST#>".

The sixth line above needs to have the full URL of the appropriate "allsites" registration page. For example, for XXX Sex Photos, the line should have value="http://www.xxxsexphotos.com/mxsp_allsites.sml".

The other lines don't need to be altered.

10. The Allsites Page

After a user has filled out the survey page and submitted it, they will be directed to the allsites registration page. Using SML conditionals, this page is responsive, depending on the answers to the questions in the survey page.

Nothing in this page needs to be customized for a particular site.

11. SoftSales Page

If the user hits the browser's back button from the warning page, they will get presented with a "soft" sales page. That is the images in this page are softer than those in the sales page. The JavaScript in this page shows a variation over the regular sales page.

If the user presses the back button at the softsales page, they would normally go to a banners page specific to the current site (see next section). However if the user has come to our Warning without a banner ID (a small percentage) they may be under age so we don't want them to go to the banners page. For this reason, the JavaScript on the softsales page is different than the regular sales page.

```
if (parent.acb == "")
{
  parent.backTo="http://198.168.54.139/thrill-cgi/ad/xpics/ricochet.cgi?xpicsr";
  parent.warpTo="http://198.168.54.139/thrill-cgi/ad/xpics/ricochet.cgi?xpicsr";
  parent.backToTop=true; //blow away frame
}
else
{
  parent.backTo="mmuse_banners.sml";
  parent.warpTo="mmuse_banners.sml";
}
window.defaultStatus=parent.defaultStatusMsg;
parent.loadPage();
}
```

The JavaScript above sends a user without a banner ID to CyberThrill. If they do have a banner ID, they go to the banners page (mmuse_banners.sml). These lines could change depending on who we are directing potentially underage users to.

WARNING: MAKE SURE THE FIRST LINE ON THE REGULAR SALES PAGE:

<#MAC.visit#>

IS NOT ON THE SOFTSALES PAGE!!!

12.2.2. Not Always Directed to PG Website

The JavaScript below will direct the user to the CyberThrill site if they have not clicked the enter button on the warning page (ie, haven't gone to the first sales page). If they have clicked the enter button, they will be directed to the "non-mousetrap" sales page of the Video Sex Channels" site (see section 15.2 for loading a mousetrap at a sales page instead of the warning page).

```
<SCRIPT LANGUAGE="JavaScript">
if (!parent.enterClicked)
{
    parent.backTo="http://198.168.54.139/thrill-cgi/ad/xpics/ricochet.cgi?xpicsr";
    parent.warpTo="http://198.168.54.139/thrill-cgi/ad/xpics/ricochet.cgi?xpicsr";
    parent.backToTop=true; //blow away frame
}
else
{
    parent.backTo="http://www.videosexchannels.com/vsc_sales.sml?bid=<#.bid#>&refer=
    MMUSE_banners.sml-<#MAC.NBHOST#>";

parent.warpTo="http://www.videosexchannels.com/vsc_sales.sml?bid=<#.bid#>&refer=
    MMUSE_banners.sml-<#MAC.NBHOST#>";
    parent.backToTop=true; //blow away frame
}
window.defaultStatus=parent.defaultStatusMsg;
parent.loadPage();
</SCRIPT>
```

12. Banners Page

12.1. Links

All links in the banners page need to have the following:

Target="_top" OnClick="parent.clicked(this)"

EXAMPLES

Exemplary applications of the invention are described in the appended sections titled "The Moustrap For HTML Designers" and "The Mousetrap Programmer's Guide."

For example, a link to the ass website could look like the following:

```
<a href="http://www.xpics.com/ass/ass.html?acb=acb100001-1100" Target="_top"
OnClick="parent.clicked(this)">
```

12.2. JavaScript

This is the last stop in the mousetrap before the mousetrap is exited. We have two variations in the JavaScript for the banners page:

1. The user always gets directed to CyberThrill (or another PG rated website) with a back button or warp.
2. If the user has hit the enter button and is backing up from the survey page, they can directed to the sales pages of another Xpics site with a back button or warp. If the user has backed off from the warning page (and gone to the softsales page) they will get directed to CyberThrill (or another PG rated website) with a back button or warp.

12.2.1. Always Directed to PG Website

The JavaScript below will always direct the user to the CyberThrill site with the back button or warp:

```
<SCRIPT LANGUAGE="JavaScript">
    parent.backTo="http://198.168.54.139/thrill-cgi/ad/xpics/ricochet.cgi?xpicsr";
    parent.warpTo="http://198.168.54.139/thrill-cgi/ad/xpics/ricochet.cgi?xpicsr";
    parent.backToTop=true; //blow away frame
    window.defaultStatus=parent.defaultStatusMsg;
    parent.loadPage();
</SCRIPT>
```

13. Testing

The mousetrap *needs* to be tested thoroughly before it is put live. After the mousetrap has been completely setup, testing can start.

13.1. Get a Link To The Mousetrap

Put a test banner or link (with a test banner ID) that can be clicked on to jump to the mousetrap frameset page. Ideally the page with this link would be on another server. This link will be used to check if the referer is being passed properly through to the registration page. Also, by entering with the banner ID, we can verify that the banner ID is being passed to the registration page.

As an example, the following links were setup to test development sites in a computer named KAUAI:

<a href="http://kauai.sbusiness.com/xpics/ass/mass_index.sml?acb=acb100002-60000">Ass Award</a><br>

<a href="http://kauai.sbusiness.com/sexmuseum/mmuse_index.sml?acb=acb100002-60000">Sex Museum</a><br>

<a href="http://kauai.sbusiness.com/sexroulette/mroul_index.sml?acb=acb100002-60000">Sex Roulette</a><br>

13.2. Test All Links

Every link on every page needs to be tested. Make sure that the frameset is blown away (and without generating a new window) where the link has target="_top" in it.

Be sure to check the links on one of the footers, the banners page, registration pages, sales pages (including the member area and webmaster area).

*In other words, check all links on every page!*

13.3. Test Back & Warp on All Pages

Go to *each* page and hit the back button to verify that the "parent.backTo" gets loaded. Go to *each* page and warp out. You can do that my simply re-loading the frameset page. When you warp, you should open a new browser window with the proper page loaded in it. To test the next warp, you have to close the new window.

To test the softsales page back/warp, you will have to load the frameset page both with an ACB banner ID and without one. If you arrive with a banner ID, you will back/warp from softsales to our banners page. Without a banner ID, you will bypass our banners page and go to a GP rated type site (like CyberThrill).

13.4. Verifying That Parameters Are Passed

Using the link created in section 13.1, click to the frameset page (this creates a referer). Click the Enter button on the on the warning page and from the sales page, click to the first registration page.

Using your browser to view source (view frame source) and you will see the source of the registration page without the SML converted to HTML.

Scroll down the registration page and located the hidden input fields with the names of PARM6, PARM18, and PARM22 as shown below:

```
<input type="hidden" name="PARM6" value="http://kauai.sbusiness.com/jump.htm">
<input type="hidden" name="PARM18" value=" MMUSE_sales1_Live-xpics_server6">
<input type="hidden" name="PARM19" value="NEW">
<input type="hidden" name="PARM22" value="acb100002-60000">
```

PARM6 is the referer. In this case, we had the links to the frameset page (mentioned in section 13.1) on the domain of "kauai.sbusiness.com".

PARM18 is the feeder. The feeder should start with capital letters. If there are multiple links on the sales page, the feeder should indicate which link we came from. For example, the above feeder came from the "mmuse_sales1.sml" page with a click on the "Live Sex Shows". The page was served up from "xpics_server6".

PARM22 is the banner ID passed to the frameset page when it was first loaded.

These above three parameters must be present and functional.

13.5. Register Somebody

Using a test credit card, register a fictitious person (ask Gene to set up a test credit card). Register somebody once from *every* registration page, selecting different memberships. Put your sbusiness email address in the registration page so we can locate all test memberships and easily delete them. Using the "XPics - Adult City SuperServer Administrator" at:

http://admin.xpics.com/xpl/admin/

Verify that the username you choose is available. Then after retrieving that user's info, verify the following is correct:

1. Name
2. Feeder
3. Referrer
4. Membership type
5. Banner ID
6. Credit card & expiration

14. Troubleshooting

There are various simple troubleshooting tools and techniques available to quickly isolate a problem.

14.1. PARM6, 18, or 22 Missing

Make sure that you have a proper banner or link to the frameset page. When the frameset page is loaded from your link, you should see something like the following in the browser's location window:

http://www.sexmuseum.com/mmuse_index.sml?acb=acb100002-60000

You need to have the "sml?acb=acb100002-60000" parameter appended to the URL of the frameset page.

14.1.1. Check The Warning Page

With the warning page in the main frame (and using Netscape 4) right click anywhere on the warning page and select "View Frame Info" You should see something like the following:

http://www.sexmuseum.com/mmuse_warning.sml?SID=0380ed760164&bid=acb100002-60000

You can see that we are looking at info for the warning page on Sex Museum. There should be a number after the "SID=". Then the "bid=" should be following by the test banner ID. A problem here indicates the frameset definition for the "main" frame (on the frameset page) is not correct.

14.1.2. Check the Sales Page URL

Click on the Enter button and load the sales page. After the sales page is loaded right click anywhere on the warning page (using Netscape 4), and select "View Frame Info". You should see something like the following:

http://www.sexmuseum.com/mmuse_warning.sml?SID=0380ed760164&bid=acb100002-60000

As in the warning page, you should see a number after the "SID=" and the banner ID should be after the "bid=". If this is incorrect, there is a problem on the "Enter" link on the warning page (probably SML).

14.1.3. Check the Sales Page Links

With the sales page in the browser, view the source for the sales page (view frame source) and look for the links to the registration pages. Verify that these links are correct. For example, in Sex Museum, the link to the "Live Shows" looks like the following:

```
<A HREF="mmuse_livesex.smf?feeder=MMUSE_sales_1_Live-xpics_server6&SID=0380ed760164&bid=
acb100002-60000" OnClick="parent.clicked(this)" OnMouseOver="return parent.setStatus('Check It Out -
Live!')" OnMouseOut="return parent.setStatus('')">
```

Verify that the "feeder=" and "SID=" are present and are the correct format. Also the OnClick="parent.clicked(this)" needs to be present. OnMouseOver and OnMouseOut are optional.

14.1.4. Check the Registration Page

If the above all checkout, the problem has to be in the registration page. Verify in the registration file the following is correct:

```
<input type="hidden" name="PARM6" value="<#SID.referer#><#SID.tracked#>">
<input type="hidden" name="PARM18" value="<#.feeder#>">
<input type="hidden" name="PARM19" value="NEW">
<input type="hidden" name="PARM22" value="<#.bid#>">
```

14.2. Back or Warp Is Doesn't Work

As a trouble shooting aid, go the frameset page and the frameset definition itself near the bottom of the page. You should see the following:

```
<FRAMESET ROWS="100%,*" SCROLLING=no BORDER=0 frameborder=no framespacing=0
onUnload="unload()">
```

Change the frameset definition to the following:

```
<FRAMESET ROWS="*,40" SCROLLING=no BORDER=0 frameborder=no framespacing=0
onUnload="unload()">
```

After re-loading the frameset page, you will see a 40 pixel window at the bottom of the screen. It shows the hidden2 file which has the "backTo" and "warpTo" variables. You can verify that these variables are correct for each page. For example, from the warning page, these variables should be set for the softsales page.

If the mousetrap mechanism is working properly, the small window at the bottom (the hidden frame) should change from the hidden1 page to the hidden2 page with each link click and browser back button press. If it doesn't, check the JavaScript between the "</title>" and "</head>" and the "OnClick=..." JavaScript on suspected link.

15. Esoterica

15.1. Hosts File

When editing on a server that has multiple mirrors, the only way to guarantee getting to the proper is to enter the IP address instead of a URL. For example, if you would like to go to Ass on "xpics_server1", you would enter the following URL:

http://208.215.61.5/ass/mass_index.sml?acb=acb100002-60000

Assuming you have Windows NT, an alternative to the above is to open up the "hosts" file. On Windows NT 4, you should open the following file in Notepad (if you can't find the file there, just use "Find" off the "Start" button to locate the "hosts" file):

winnt\system32\drivers\etc\hosts

With the following entries in your hosts file, every time your browser requests "www.xpics.com", for example, you will automatically get directed to the 208.215.61.5 IP address.

```
127.0.0.1       localhost
208.215.61.5    www.xpics.com
208.215.61.12   www.sexmuseum.com
208.215.61.11   members.sexroulette.com
208.223.222.18  www.videosexchannels.com
208.223.222.31  www.xxxsexphotos.com
```

15.2. Starting the Mousetrap On a Non-Warning Page

The Mousetrap normally starts on the warning page. As discussed in section 5.1.1, the warning page filename is set in the frameset page.

If you would like to start a mousetrap from at the sales page for example, you would enter the following URL:

http://www.sexmuseum.com/mmuse_index.sml?acb=acb100002-60000&startAt=mmuse_sales1.sml This would start the mousetrap at the sales page in the Sex Museum mousetrap instead of the warning page.

This might be used when leaving backing/warping from the banners page and "enterClicked" is true (see section 12.2).

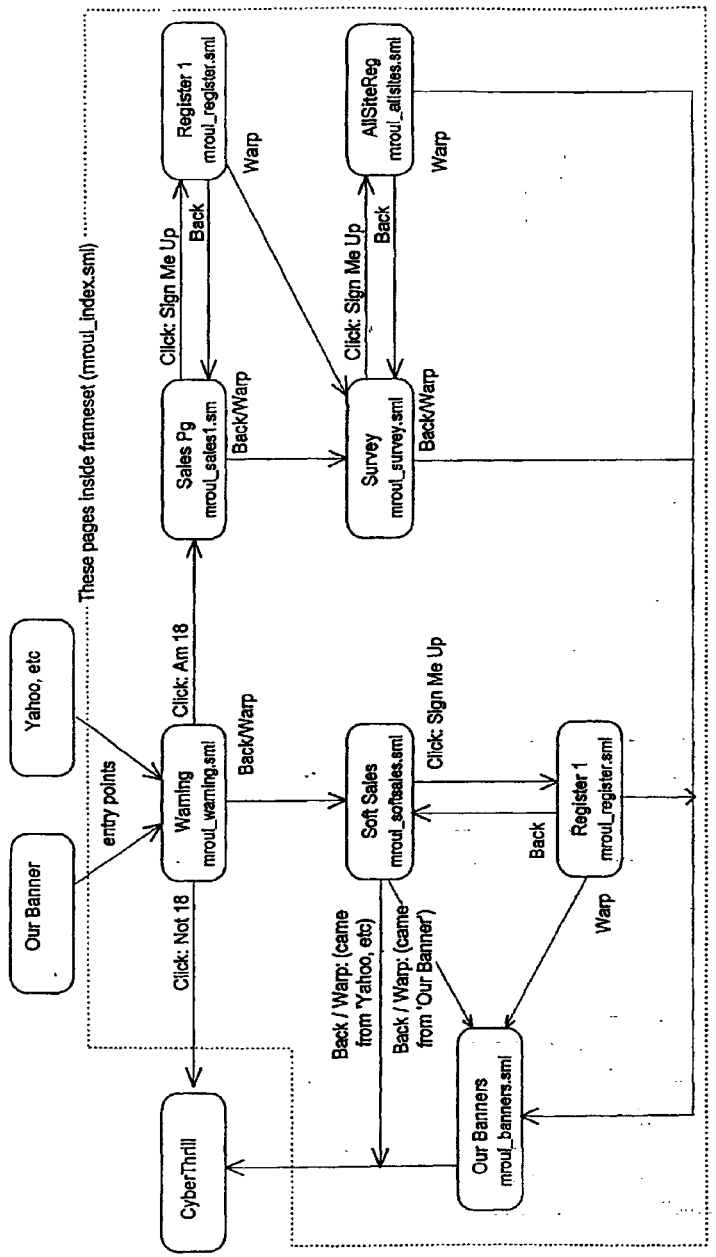

The Mousetrap Programmer's Guide

1. The Mousetrap Effect..................................................................................................1
2. Operation Overview..................................................................................................1
3. The Details (Overview).............................................................................................3
4. The Frameset Page....................................................................................................3
   4.1. The .goTo and .startAt SML variables................................................................3
   4.2. The .acb SML variable.........................................................................................4
   4.3. Constants..............................................................................................................4
      4.3.1. defaultStatusMsg.........................................................................................4
      4.3.2. Hidden Frame Pages...................................................................................4
      4.3.3. defaultWarpTo............................................................................................5
   4.4. Variables..............................................................................................................5
      4.4.1. window.defaultStatus..................................................................................5
      4.4.2. acb................................................................................................................5
      4.4.3. backToTop...................................................................................................5
      4.4.4. linkClicked=false........................................................................................6
      4.4.5. warpTo=""...................................................................................................6
      4.4.6. newWin=true...............................................................................................6
      4.4.7. timerID=false..............................................................................................6
      4.4.8. firstPageLoaded=false................................................................................6
      4.4.9. enterClicked=false......................................................................................6
      4.4.10. initialLocation..........................................................................................7
   4.5. The Functions......................................................................................................7
      4.5.1. function unload()........................................................................................7
      4.5.2. function clicked(aLink)..............................................................................8
      4.5.3. function setStatus(msg)..............................................................................8
      4.5.4. function loadPage()....................................................................................9
      4.5.5. Frameset Definition...................................................................................9
      4.5.6. NOFRAME................................................................................................10
5. The Hidden Frame..................................................................................................10
   5.1. The hidden1 File...............................................................................................10
      5.1.1. if (parent.firstPageLoaded)......................................................................11
      5.1.2. if (!parent.linkClicked).............................................................................11
      5.1.3. if (!parent.backToTop)..............................................................................11
   5.2. The hidden2 File...............................................................................................11
6. The Main Frame.....................................................................................................12
   6.1. The Warning Page.............................................................................................12
   6.2. Sales Page..........................................................................................................12
      6.2.1. MAC.visit..................................................................................................12
   6.3. Registration (Age Verification) Page...............................................................13
      6.3.1. No loadPage()...........................................................................................13
      6.3.2. isSent.........................................................................................................13
      6.3.3. Parent.newWin.........................................................................................13
      6.3.4. The Submit Button...................................................................................14

6.4. Survey Page..........................................................................................................14
6.5. Allsites Registration Page.....................................................................................15
6.6. Softsales Page.......................................................................................................15
6.7. Banners Page........................................................................................................16
  6.7.1. Links................................................................................................................16
  6.7.2. Unconditional Back/Warp................................................................................16
  6.7.3. Conditional Back/Warp....................................................................................17
7. Mousetrap Flow Drawing -- Flow Chart for Sex Roulette...........................................18

The Mousetrap
Programmer's Guide

1. The Mousetrap Effect

Normally the back button in a browser takes the user to the previous page. The "mousetrap" however, has the ability to redirect a user to a new URL when the back button is pushed. In addition if the user "warps" (change location via bookmarks, history list or typing in a new URL), a new browser window opens.

Lets look at a few senarios:

1. The user comes to the "Warning" page and hits the back button. They do not return to their previous URL but instead see a "soft" sales page (the photos are softcore). If they hit the back button again, they end up on a banners page. If they now decide to "warp" by going to their bookmarks, they will go the location they "warp" to but they will also open up a new browser which will overlay the warped-to browser window with yet another sales page.

2. The user comes to the "Warning" page and hits the enter button to go to a sales page. From the sales page, they click on a link and enter an age verification page. They do not have a credit card and decide to "warp" to a new location. Their browser opens up a new window with a "survey" page on it. They close the window with the survey and discover that the placed they warped to is now displaying in their original browser window.

3. The user comes to the "Warning" page and hits the enter button to go to a sales page. From the sales page, they hit the back button but instead of going back to the warning page, they see a "survey" page. If the user fills out the survey, they will get a free subscription to all sites. They fill out the survey and see the age verification page registration page. They fill out the form and enter the members area.

2. Operation Overview

The core function of the mousetrap is achieved through the use of a hidden frame and JavaScript. All pages in the mousetrap are displayed within a frameset which has two frames, a frame named "main" which fills up 100% of the frameset and a frame named "hidden" which is indeed hidden.

When the user clicks on a link (like the "Enter" on a warning page), the main frame (no pun intended) is loaded. While the browser is loading the main frame (with a sales page), it starts to execute the JavaScript on the sales page. This JavaScript runs the "loadPage()" function which then loads into the hidden frame, the "hidden1" page. The "hidden1" page then executes its JavaScript which then loads the "hidden2" page.

NOTE: <u>To install a Mousetrap, you *must* read "The Mousetrap for HTML Designers"</u>.

This is the sequence of events for a link click:

Link Click Events (Click Enter on Warning Page)[1]

| Event# | Description | Frameset | JavaScript[2] |
|---|---|---|---|
| 1 | Click Enter on Warning page | main | parent.clicked() |
| 2 | Load Sales1 Page | main | parent.loadPage() |
| 3 | Load Hidden1 | hidden | loadPage() (in hidden1) |
| 4 | Load Hidden2 | hidden | — |

Notice that the last page loaded in the browser's history list is the "hidden2" page (hidden1 and hidden2 are frameset variables, which hold the URL's of the documents loaded into the "hidden" frame).

When the user presses the browser's "back" button the hidden2 page is unloaded and the hidden1 page is loaded. The hidden1 page runs it's "loadPage()" function which then loads a page into the "main" frame. The user will not return to the warning page but instead will see a second sales page in the "main" frame. The Sales2 page will then load the Hidden2 page into the hidden frame:

This is the sequence of events caused by pressing the browser's back button:

Back Button Event (Backing from First Sales Page)[1]

| Event# | Description | Frameset | JavaScript[2] |
|---|---|---|---|
| 1 | Browser's back button clicked | — | — |
| 2 | Load Hidden1 | hidden | loadPage() (in hidden1) |
| 3 | Load Sales2 Page | main | parent.loadPage() |
| 4 | Load Hidden2 | hidden | — |

From the second sales page, if the user decides to "warp" by going to Yahoo via a bookmark, the frameset page itself will unload. When the frameset unloads, its "onUnload" event causes the execution of its "unload()" function. This function creates a new window with yet another sales page in it (perhaps a page of banners).

This is the sequence of events caused by "warping" to Yahoo:

Jumping to new URL via Bookmark[1]

| Event# | Description | Frameset | JavaScript[2] |
|---|---|---|---|
| 1 | Original window loads Yahoo | main | frameset's "unload()" |
| 2 | New Window loads hidden1 page | hidden | — |
|   | and banners page | main | parent.loadPage() |
| 3 | Load Hidden2 | hidden | — |

Note 1: At the start of events, the "hidden2" page is currently in the "hidden" frame.
Note 2: This is the JavaScript function which initiates the next event.

The Mousetrap Programmers Guide

3. The Details (Overview)

The next three sections explain the functions and interactions of the frameset, main, and hidden pages. See Appendix A for flowchart drawing of Sex Roulette sales site (as of February 9, 1998).

This section assumes a familiarity with SML (see *SML for Dummies* at the following URL: http://kona.sbusiness.com/sml_for_dummies/). This section also assumes familiarity with JavaScript.

*Note: The mousetrap mechanism allows the normal use of sales pages if the browser has JavaScript turned off or is not JavaScript enabled. It is even possible to access the sales pages if the browser is not "frames" enabled. In these cases, the back button will operate normally.*

*Netscape 2 executes the back button at the frameset level and removes the entire frameset. This means that the "back" button acts like a "warp" in Netscape 2.*

4. The Frameset Page

The frameset page contains the JavaScript functions and variables accessed by the various pages loaded into the "main" and "hidden" frames. The beauty of frameset level variables, is that state can be maintained between pages. Typically this page is named something like "mmuse_index.sml" or "mass_index.sml" (the first "m" stands for mousetrap).

We will go through the frameset page line by line and provide comments.

4.1. The .goTo and .startAt SML variables

Normally the warning page is first loaded when the mousetrap starts up. However, the following URL would allow the starting at another page:

http://www.sexmuseum.com/?startAt=mmuse_sales1.sml

The first of the following lines allows that to happen (they must be in this order):

```
<$if cond:.startAt,cond:!.goTo val:.goTo=.startAt><$endif>
<$if cond:!.goTo val:.goTo="mmuse_warning.sml"><$endif>
```

It might be easiest to examine the overall effect of the these two lines by looking at the "goTo" defined condition:

Condition1 - goTo not defined: If "startAt" is defined, "goTo" is assigned to it. Otherwise the warning page is loaded.

Condition2 - goTo defined: When the user warps, a new window is opened with a URL that may look like the following:

http://www.sexmuseum.com/?bid=acb100002-60000&goTo=mmuse_survey.sml

The "goTo" variable is used to in the frameset definition to load a page into the main frame.

4.2. The .acb SML variable

Typically the sales sites are entered through the clicking of a banner. That banner includes in its URL a parameter to identify the person and banner. The following URL will load the sex museum sales page:

http://www.sexmuseum.com/?acb=acb100001-g1400

In the "acb" parameter (ad campaign banner), the 100001 is the advertiser number and the g1400 is the number corresponding to a particular banner.

Raw hits are assigned to an advertiser whenever the server notices a page loaded with the "acb" parameter in the URL. With the following line:

```
<$if cond:.acb val:.bid=.acb><$endif>
```

If the .acb variable exists (not everyone comes from a banner), the SML variable .bid is assigned to its value. On subsequent pages, the advertiser number is passed by appending the following to the URL:

?bid=acb100001-g1400

We don't want to append "?acb=acb100001-g1400" because this could inadvertently cause another raw hit to be assigned to the advertiser.

4.3. Constants

4.3.1. defaultStatusMsg

Each page sets the default message by loading the following variable:
```
defaultStatusMsg="Welcome to Sex Museum";
```

4.3.2. Hidden Frame Pages

The hidden frame gets loaded with the URLS of the following variables.
```
hidden1="mmuse_hidden1.sml"; //Change in frameset definition too
hidden2="mmuse_hidden2.sml";
```

Note that the URL at hidden1 must also be set in the frameset definition.

4.3.3. defaultWarpTo

It appears that Netscape 2 cannot retain variables in its parent frame when going from page to page.

```
defaultWarpTo="mmuse_survey.sml";//Kludge for Netscape 2 - warp
location in registration off sales 1
```

The registration (age verification) pages can be reached from different sales pages (the softsales and regular sales pages may use the same registration pages). Because of this, the registration pages do not re-define the "warpTo" or "backTo" variables and do not run the parent.loadpage() function as well. This allows a normal "back" browser function to occurs and the user can return to the previous sales page.

With Netscape 2, if someone warps out of a registration page, the parent.warpTo variable contains garbage. If there is garbage in the "warpTo" variable, the "defaultWarpTo" value is used instead. This variable is used in the "unload()" function (see section 0).

4.4. Variables

Each page loaded into the "main" frame sets the window's "defaultStatus with the following variable:

4.4.1. window.defaultStatus

This sets the default status message for the current window, which is the frameset page.

4.4.2. acb

The following loads the "acb" variable with the current banner ID:

```
acb ="<#.bid#>";
```

This variable is checked in the softsales page to decide whether to send the user to our banners page. If the user has come from Yahoo, for example, they won't have a banner ID and they may also be under age so they are not sent our banners page.

4.4.3. backToTop

When the user hits the back button, they normally load a new page within the current frameset. The following line sets this default:

```
backToTop=false;
```

In the "banners" page, however, this variable is set to true (parent.backToTop=true). This allows the user to back out of the banners page and totally exit the mousetrap: the frameset page gets unloaded and replaced with a new page (the mousetrap's last gasp).

4.4.4. linkClicked=false

When a linked is clicked this variable is set to true.

The sequence of loading the main frame and the hidden frame pages varies, depending on the setting of this variable. This variable is set in the "clicked(aLink)" function and used in a function defined in this section ("loadPage()") and in the hidden1 page.

4.4.5. warpTo=""

This variable is set by the various pages loaded into the main frame. If the user tries to leave the sales pages via bookmarks, history list, or just typing in a URL, the user will end at the URL/file pointed to by this variable.

4.4.6. newWin=true

The setting of this variable determines if we should create a new window at warp time. This is normally set to true except when the submit button is clicked on the registration page. After the submit button is pressed, the user may get presented with a page that has a link to the members area. This link has the 'target="_top"' attribute and we don't want to create a new sales window when the frameset is blown away as the user tries to enter the members area.

4.4.7. timerID=false

This variable is used in the "setStatus(msg)" function to indicate if a timer is running.

4.4.8. firstPageLoaded=false

This variable is used and set in the hidden1 page. Normally hidden1 would load hidden2 but the first time hidden1 is loaded, hidden1 does nothing because this variable is set to false. This allows the first page loaded into the main frame to load hidden2 and thus guaranteeing that hidden2 will load *after* the first main frame page.

4.4.9. enterClicked=false

This variable is currently used on the Sex Museum site. It is set to true on the "mmuse_survey.sml" page. If the user gets to the survey page and then hits the back button, they will end up on the banners page. It is also possible to get to the banners page by hitting the back button from the warning page. For users who have gotten to the banners page and have clicked "Enter" on the warning page, we drop them into the sales pages of another site.

4.4.10. initialLocation

The following initializes the initialLocation variable:

```
i=location.href.indexOf("?acb=");
if (i==-1) initialLocation = location.href;
else initialLocation = location.href.substring(0,i) + "?bid" +
    location.href.substring(i+4,location.href.length);
```

This variable is used in the "unload()" (see section 0). Basically the above lines change the "acb" parameter name in a URL to "bid" if the "acb" exists.

For example:

http://www.sexmuseum.com/mmuse_index.sml?acb=acb100002-60000 becomes:

http://www.sexmuseum.com/mmuse_index.sml?bid=acb100002-60000

If the user warps out and a new window with a new frameset is loaded, we need to change "acb" to "bid" because it might be possible to give another payed click to the same advertiser (the server looks for "acb=acb..." in a URL to assign a visit to an advertiser).

4.5. The Functions

4.5.1. function unload()

This function runs when the frameset page is unloaded caused by the user attempting to warp away from our sales site.

```
if ((warpTo.indexOf(".sml") == -1)&&(warpTo.indexOf(".htm")== -1)
    && (warpTo.indexOf("http") == -1)) warpTo = defaultWarpTo;
```

The above lines are used to get around a limitation in Netscape 2 JavaScript. Variables set in the frameset (parent) page are not retained when a new page is loaded into the main frame. See "defaultWarpTo" in section 4.3.3 for more information. A corrupted "warpTo" is detected by checking to see if it has the ".sml", ".htm", or "http" strings in it.

```
if ((window.name != "newWindow") && newWin)
```

A new window will only be created at warp time if we are not already in a new window and the "newWin" is true. We only create a new window at warp time only once so the user can leave the sales site the second time they warp out.

```
{
    if (backToTop)
        window.open(warpTo,'newWindow');
```

If "backToTop" is true, the frameset page will be replaced with the URL indicated by the "warpTo" variable and we will have exited the mousetrap.

```
else
{
    if(initialLocation.indexOf("?") == -1)
        initialLocation=initialLocation + "?";
    else initialLocation=initialLocation + "&";
    window.open(initialLocation + 'goTo=' + warpTo,'newWindow');
}
```

Next the function checks to see if "initialLocation" has a "?", if not it adds one, otherwise it adds a "&". Finally, we reload the frameset page with the "goTo" parameter appended to the end of the initial frameset's URL.

4.5.2. function clicked(aLink)

This function needs to run every time a link is clicked. Every link should invoke this method via the "onClick" event.

```
linkClicked=true;
if (aLink.target && (aLink.target.indexOf('_top') == 0))
    newWin = false;
```

This function sets "linkClicked" and then checks to see if the link's target attribute is set to "_top". If so, we don't want to create a new window when this link is clicked ("newWin" is used in the "unload()" function [see section 0]).

4.5.3. function setStatus(msg)

This function is called from within all pages that wish to set the status message when the user places the mouse pointer over a link.

```
top.main.status=msg;
if (timerID) clearTimeout(timerID);
if (msg != '') timerID=setTimeout("window.status=''",5000);
return true;
```

The timer function is used because Internet Explorer does not support a onMouseOut event. The timer will automatically clear the status message after 5 seconds. If the timer is running when this function is entered, it gets initially cleared before being set again.

4.5.4. function loadPage()

This function along with the function in hidden1 contain the logic to control the back button's action.

```
if (!firstPageLoaded) {setTimeout('loadPage()',500);return}
```

The warning page is the first page to call "loadPage()." If hidden1 has not been loaded (indicated by "firstPageLoaded" being false), the warning page cannot load hidden2. We want to be sure that hidden1 has been loaded before hidden2 is loaded (otherwise there will be no browser history of hidden1 preceding hidden2).

The above code starts a cycle of calling the "loadPage()" (i.e. calling itself) every ½ second until hidden1 is loaded. Once hidden1 is loaded (and it sets "firstPageLoaded to false), "loadPage()" can continue to the next section:

```
if(!parent.linkClicked)
    parent.hidden.location.href=hidden2 + "?<#SID=.#>";
else
    parent.hidden.location.href=hidden1 + "?<#SID=.#>&bid=<#.bid#>";
```

In the first case, "linkedClicked" is false. This means that the current page in the main frame (the one calling this function) was not loaded through a link click. That is it was was loaded by the "loadPage()" function in hidden1 (which means the browser's back button was pressed). Therefore the hidden2 must be loaded in the hidden frame. See "Operation in a Nutshell" page 1 for details in the sequencing of a browser's back button press.

In the second case, the current page in the main frame (the one calling this function) was loaded through a link click. This means hidden1 must be loaded in the hidden frame. Hidden1 will then load hidden2. See "Operation in a Nutshell" page 1 for details in the sequencing of a link click.

4.5.5. Frameset Definition

The frameset definition sets up a page with two frames, one taking up 100% of the frameset and the other taking up the remainder (which is nothing so the frame is hidden).

```
<FRAMESET ROWS="100%,*" SCROLLING=no BORDER=0 frameborder=no
framespacing=0 onUnload="unload()">

<FRAME SRC="<#.goTo#>?<#SID=.#>&bid=<#.bid#>" NAME="main"
SCROLLING=auto BORDER=0 frameborder="0">

<FRAME SRC="mmuse_hidden1.sml?<#SID=.#>&bid=<#.bid#>"
NAME="hidden" SCROLLING=no BORDER=0 frameborder="0">
```

The main frame gets its source set from the .goTo SML variable. When the frameset is first loaded, this variable is set to the warning page. If there is a warp, this variable is set to whatever the "warpTo" variable was set to at warp time. The SML state ID and the banner ID parameters are also passed in this URL.

The hidden frame initially loads the hidden1 file, passing to it the SML state ID and the banner ID parameters.

4.5.6. NOFRAME

This section allows a non-frames browser access to the sales pages. The .goTo will take the user to the warning page or the warped to page.

```
<NOFRAME><HTML><HEAD>
<TITLE>Sex Roulette</TITLE></HEAD>
<BODY TEXT="#FFB000" BGCOLOR="#000000" LINK="#DD0000"
    VLINK="#DD0000" ALINK="#FFFF80">
Click <a href=<#.goTo#>>here</a> to continue...
</BODY>
</HTML>
</NOFRAME>
```

5. The Hidden Frame

The hidden frame is the secret behind the operation of the mousetrap. The hidden frame always loads last. Consequently when the browser's back button is pressed, the hidden2 file first unloads and then the hidden1 file gets loaded. Hidden1 has a JavaScript which then loads a page into the main frame.

5.1. The hidden1 File

This file is loaded into the hidden frame and is used to load the main frame when the back button is pressed.

```
function loadPage()
{
  if (parent.firstPageLoaded)
  {
    if (!parent.linkClicked)
    {
      if (!parent.backToTop)
        parent.main.location=parent.backTo +
          "?<#SID=.#>&bid=<#.bid#>";
      else
      {
        parent.newWin=false;
        top.location=parent.backTo;
      }
    }
    else
      parent.hidden.location=parent.hidden2;
    parent.linkClicked=false;
  }
  else parent.firstPageLoaded = true;
}
```

5.1.1. if (parent.firstPageLoaded)

We first check to see if this is the first time this file is being loaded. If so we do nothing except set the "parent.firstPageLoaded" variable to true. The first time this file is being loaded is when the frameset is being first loaded... the frameset loads this page into the hidden frame. Normally hidden1 would load the main frame but initially, this is being done by the frameset page.

5.1.2. if (!parent.linkClicked)

We need to check if this page got loaded by the pressing of the back button or by the "parent.loadPage()" being executed by the page in the main frame.

If the "parent.linkClicked" variable is true, then this page was loaded by the main frame page after a link click and we need to load the hidden frame with the hidden2 file.

Otherwise this page got loaded by the hitting of the browser's back button and we need to do further testing.

5.1.3. If (!parent.backToTop)

If "backToTop" is false, we will load the main frame with the "backTo" page. Otherwise we will replace the entire frameset with the "backTo" page.

5.2. The hidden2 File

The logical purpose of this page is mostly that of a placeholder... something to load after the main frame and hidden1 is loaded. The JavaScript in the body of this page is used strictly for testing purposes:

```
<script language="JavaScript">
    document.write("parent.backTo=" + parent.backTo + " | | | | | | ");
    document.write("parent.warpTo=" + parent.warpTo + " | | | | | | ");
</script>
```

To use the above in testing you have to modify the frameset page and the frameset definition itself near the bottom of the page. On the frameset page you should see the following:

```
<FRAMESET ROWS="100%,*" SCROLLING=no BORDER=0 frameborder=no framespacing=0
onUnload="unload()">
```

Change the frameset definition to the following for testing with the hidden2 file:

```
<FRAMESET ROWS="*,40" SCROLLING=no BORDER=0 frameborder=no framespacing=0
onUnload="unload()">
```

6. The Main Frame

The main frame contains all the pages the user views. Most pages have a similar JavaScript between the </title> and </head>.

6.1. The Warning Page

The warning page has the following JavaScript:

```
<SCRIPT LANGUAGE="JavaScript">
<!-- Script start
    parent.backTo="mxsp_softsales.sml";
    parent.warpTo="mxsp_softsales.sml";
    window.defaultStatus=parent.defaultStatusMsg;
    parent.loadPage();
// Script end -->
</SCRIPT>
```

The first two lines set the backTo and warpTo variables in the frameset page. The third line sets the default message. The fourth line starts the loadPage() function (which starts the sequence of loading into the hidden frame).

6.2. Sales Page

6.2.1. MAC.visit

The sales page has an SML tag on top of it:

`<#MAC.visit#>`

This SML tag causes a visit to be registered for the advertiser who's banner ID is appended to the URL as below:

http://www.xxxsexphotos.com/mxsp_index.sml?acb=acb100002-60000

When the user clicks the enter page and loads the page with the "MAC.visit" tag, the advertiser with the number "100002" gets paid for a click.

*This tag should not be on the softsales page.* We don't pay an advertiser when they attempt to back off the warning page.

The JavaScript for this page is identical to the warning page except for one additional line:

`parent.enterClicked=true;`

When this variable is true, the user has clicked the enter button on the warning page. The banners page may optionally look at this variable to decide where to redirect the user.

6.3.4. The Submit Button

The submit button, near the bottom of the page uses an SML conditional to decide whether to use a JavaScript "button" or a regular "submit" button. The variable "SID.js" is set to true in the "hidden2" page. This page could *only* be loaded if the user had JavaScript capable browser with JavaScript enabled. Therefore the code below will only us a JavaScript button if the user is running JavaScript:

```
<$if cond:SID.js>
<CENTER><input type="button" value="Submit Information"
onClick="SubmitData( this.form )"></CENTER>
<$else>
<CENTER><input type="submit" value="Submit Information"></CENTER>
<$endif>
```

The SML conditional <$if cond:MAC.user_agent LIKE "Mozilla/[2-9]"> should only be used on non-mousetrap registration pages. We have found about 5% of users have turned off JavaScript on a JavaScript capable browser. The condition searching for "Mozilla[2-9]" will present those users with a dead button and they will not be able to register.

6.4. Survey Page

This page currently takes a survey of users but never stores the data. In development is a survey page and Perl script which will store the data to SQL Server (this project was complete in early Feb, 1998).

This page combines the JavaScript of both the warning page (section 6.1) and the registration page (section 6.3). The submit button can be a JavaScript button because the user must have JavaScript to get to this page.

The fields in this form are all passed as parameters to the URL of the "allsites" registration page. The hidden fields are used to pass the "referrer", the "bid", and the "referer". Because this is a submission, we have found it is possible to end up on a different server for the "allsites" page (especially when a Perl script "redirect" is eventually used to store the survey data). For this reason, the SID is useless and we have to directly pass the referrer as a parameter (the SID is specific to a server).

6.7. Banners Page

This page contains banners which promote Xpics' other sites. It may also contain banners of non-Xpics' sites.

6.7.1. Links

The banner links in this page all need the 'target="_top"' and the 'OnClick="parent.clicked(this)"' statements in all links. A sample link is shown below:

```
<a href="http://www.xpics.com/ass/ass.html?acb=acb100001-1100"
    Target="_top" OnClick="parent.clicked(this)">
```

6.7.2. Unconditional Back/Warp

This page has a line of JavaScript no used on previous pages:

```
<SCRIPT LANGUAGE="JavaScript">
    parent.backTo=
        "http://198.168.54.139/thrill-cgi/ad/xpics/ricochet.cgi?xpicsr";
    parent.warpTo=
        "http://198.168.54.139/thrill-cgi/ad/xpics/ricochet.cgi?xpicsr";
    parent.backToTop=true; //blow away frame
    window.defaultStatus=parent.defaultStatusMsg;
    parent.loadPage();
</SCRIPT>
```

The line "parent.backToTop=true" allows us to replace the frameset page with the pages at the backTo/warpTo URL's. This means the user will be exiting the mousetrap and is free to warp to wherever they wish. Of course, if they hit the back button again, they will be back to the mousetrap.

6.7.3. Conditional Back/Warp

This page can optionally have a conditional in the JavaScript. If the person gets to this page via the Survey page, they have already clicked the enter button on the warning page. This means that we can drop them to a sales page on another Xpics site when they try to back/warp. The JavaScript for this page follows:

```
<SCRIPT LANGUAGE="JavaScript">
   if (!parent.enterClicked)
   {
     parent.backTo=
       "http://198.168.54.139/thrill-cgi/ad/xpics/ricochet.cgi?xpicsr";
     parent.warpTo=
       "http://198.168.54.139/thrill-cgi/ad/xpics/ricochet.cgi?xpicsr";
   }
   else
   {
     parent.backTo="http://www.videosexchannels.com/vsc_sales.sml?bid=
       <#.bid#>&refer=MMUSE_banners.sml-<#MAC.NBHOST#>";
     parent.warpTo="http://www.videosexchannels.com/vsc_sales.sml?bid=
       <#.bid#>&refer=MMUSE_banners.sml-<#MAC.NBHOST#>";
   }
   parent.backToTop=true; //blow away frame
   window.defaultStatus=parent.defaultStatusMsg;
   parent.loadPage();
</SCRIPT>
```

Notice in the JavaScript, the "refer" variable is being passed to the "vsc_sales.sml" page. This accomplishes two things:

1. There will be a referrer in VSC that will indicate the user came from our own banners page (via back/warp of course)

2. The SML "MAC.visit" will not be used on the sales page.

The top of the "vsc_sales.sml" page should then have the following conditional:

```
<$if cond:.refer val:SID.referer=.refer>
<$else>
<#MAC.visit#>
<!-- VH -->
<$endif>
```

On the "vsc_sales.sml" page, we don't want to cause a visit to be registered to a banner ID if the user is jumping to it via the banners page.

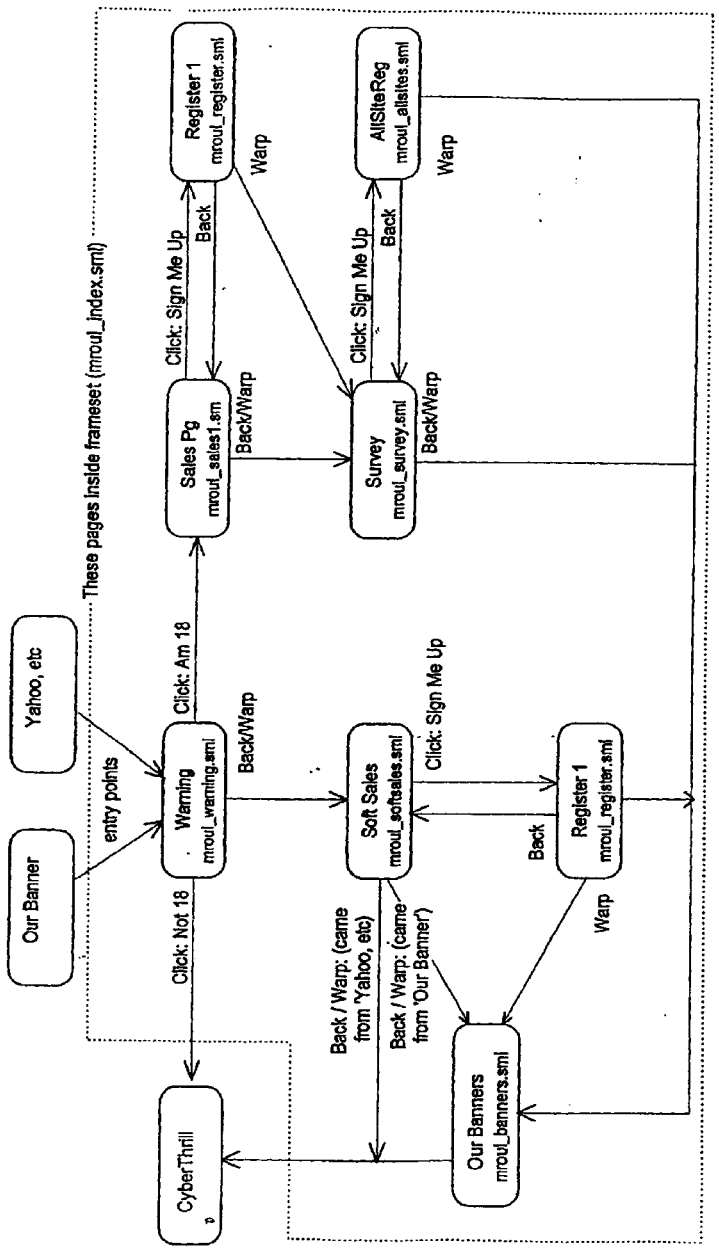
7. Mousetrap Flow Drawing -- Flow Chart for Sex Roulette
Sex Museum and Ass Awards are similar except there are 4 registration pages off the Sales Pages.
The Mousetrap Programmers Guide     02/17/98     Page 18

What is claimed is:

1. In a computer network comprising a plurality of recipient computers having browsers capable of displaying content pages, wherein individual ones of the browsers include an unloading function operable without activation of a link in displayed content to unload at least a portion of the displayed content, a method for apparently modifying operation of the unloading function of a browser displaying first content, thereby displaying predetermined second content upon activation of the unloading function, comprising the steps of:

receiving a request for first content from a recipient computer over the network;

transferring the first content to the recipient computer after said receiving step, wherein the first content is formatted for display on the recipient computer and wherein the first content includes program code configured to execute on the recipient computer upon activation of the unloading function of the browser without the selection of any link included in the first content, whereby the program code causes the recipient computer to request second content;

receiving a request for the second content from a recipient computer after the first transferring step; and transferring the second content to the recipient computer after the second receiving step.

2. The method of claim 1, wherein the unloading function of the browser is activated by requesting third content not using a link displayed in the first content, and the method further comprises preventing display of the third content on the recipient computer.

3. The method of claim 1, wherein the first transferring step further comprises transferring the first content as an HTML page.

4. The method of claim 1, wherein the first transferring step further comprises transferring the first content with the program code written in a browser script.

5. The method of claim 1, wherein the first transferring step further comprises transferring the first content with a frameset page.

6. The method of claim 1, wherein the first transferring step further comprises transferring the first content comprising a page with at least one link to a traffic-controlled page.

7. The method of claim 1, wherein the first transferring step further comprises transferring the first content comprising a page with at least one link to a non-traffic-controlled page.

8. For a computer network comprising a plurality of recipient computers having browsers capable of displaying content, wherein individual ones of the browsers have an unloading function operable without activation of a link in displayed content to unload the displayed content, a system for apparently modifying operation of the unloading function of a browser displaying first content, thereby displaying predetermined second content upon activation of the unloading function, comprising:

a provider computer adapted to connect to a computer network, said provider computer operable to serve information to a recipient computer;

a memory connected to said provider computer;

first content stored in the memory, the first content formatted for display on a recipient computer and including program instructions configured to execute on the recipient computer upon activation of the unloading function of the browser without, the selection of any link in the first content, whereby the program instructions cause the recipient computer to request predetermined second content.

9. The system of claim 8, wherein the unloading function of the browser is activated by requesting third content not using a link in the first content, and the program instructions of the first content include instructions for preventing display of the third content on the recipient computer.

10. The system of claim 8, wherein the first content is an HTML page.

11. The system of claim 8, wherein the program instructions of the first content are written in a browser script.

12. The system of claim 8, further comprising a frameset page stored in the memory for transfer to the recipient computer with the first content.

13. The system of claim 8, wherein the first content comprises at least one link to a traffic-controlled page.

14. The system of claim 8, wherein the first content comprises at least one link to a non-traffic-controlled page.

* * * * *